United States Patent
Sim et al.

(10) Patent No.: US 12,556,713 B2
(45) Date of Patent: Feb. 17, 2026

(54) METHOD AND APPARATUS FOR VIDEO CODING USING NONRECTANGULAR BLOCK SPLITTING STRUCTURE

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Min Hun Lee, Uijeongbu-si (KR); Joo Hyung Byeon, Seoul (KR); Seung Wook Park, Yongin-si (KR); Jin Heo, Yongin-si (KR)

(73) Assignees: HYUNDAI MOTOR COMPANY, Seoul (KR); KIA CORPORTION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 77 days.

(21) Appl. No.: 18/431,206

(22) Filed: Feb. 2, 2024

(65) Prior Publication Data
US 2024/0179326 A1    May 30, 2024

Related U.S. Application Data

(63) Continuation of application No. PCT/KR2022/011162, filed on Jul. 29, 2022.

(30) Foreign Application Priority Data

Aug. 19, 2021 (KR) .................. 10-2021-0109700
Jul. 28, 2022 (KR) .................. 10-2022-0093591

(51) Int. Cl.
H04N 19/159    (2014.01)
H04N 19/119    (2014.01)

(52) U.S. Cl.
CPC ......... H04N 19/159 (2014.11); H04N 19/119 (2014.11)

(58) Field of Classification Search
CPC .................................................. H04N 19/159
See application file for complete search history.

(56) References Cited

U.S. PATENT DOCUMENTS

| 11,240,501 B2 | 2/2022 | Zhao |
| 11,297,309 B2 | 4/2022 | Kim |

(Continued)

FOREIGN PATENT DOCUMENTS

| KR | 20190115426 A | 10/2019 |
| KR | 20200041801 A | 4/2020 |

(Continued)

OTHER PUBLICATIONS

International Search Report and Written Opinion cited in corresponding international patent application No. PCT/KR2022/011162; Oct. 26, 2022; 11 pp.

*Primary Examiner* — Jerry T Jean Baptiste
(74) *Attorney, Agent, or Firm* — Lempia Summerfield Katz LLC

(57) ABSTRACT

A method and an apparatus are disclosed for video coding using a nonrectangular block splitting structure prediction and transform accordingly. The video coding method and the apparatus additionally apply a nonrectangular block splitting structure, in addition to an existing splitting structure, to a current block. The video coding method and the apparatus generate reference samples according to the applied splitting structure and effectively perform prediction and transform on split blocks.

20 Claims, 40 Drawing Sheets

(56) References Cited

U.S. PATENT DOCUMENTS

| | | |
|---|---|---|
| 11,516,507 B2 | 11/2022 | Lee |
| 2021/0006778 A1* | 1/2021 | Kim ................... H04N 19/119 |
| 2021/0211660 A1* | 7/2021 | Zhao .................. H04N 19/119 |
| 2021/0344954 A1 | 11/2021 | Choi |
| 2021/0392371 A1 | 12/2021 | Lee |
| 2022/0116601 A1 | 4/2022 | Zhao |
| 2022/0182602 A1 | 6/2022 | Kim |
| 2023/0109828 A1 | 4/2023 | Lee |

FOREIGN PATENT DOCUMENTS

| | | |
|---|---|---|
| KR | 20210031783 A | 3/2021 |
| KR | 20210097803 A | 8/2021 |

* cited by examiner (a) (b)

(c) (d)

■ current block candidate positions of spatial motion vector candidate positions of temporal motion vector

[ ] reference samples used for predicting block $B_1$

[ ] reference samples used for predicting block $B_2$ reference samples used for predicting block $B_1$ reference samples used for predicting block $B_2$

[ ] reference samples used for predicting block $B_2$

[ ] reference samples used for predicting block $B_1$ transform unit configuration 1 transform unit configuration 2 transform unit configuration 3 transform unit configuration 4

SPLIT_RD2LT transform unit configuration 1 transform unit configuration 2 transform unit configuration 3 transform unit configuration 4

SPLIT_LD2RT transform unit configuration 1 transform unit configuration 2 transform unit configuration 3 transform unit configuration 4

SPLIT_RT2LD

METHOD AND APPARATUS FOR VIDEO CODING USING NONRECTANGULAR BLOCK SPLITTING STRUCTURE

CROSS-REFERENCE TO RELATED APPLICATIONS

This application is a continuation of International Application No. PCT/KR2022/011162 filed on Jul. 29, 2022, which claims priority to and the benefit of Korean Patent Application No. 10-2021-0109700, filed on Aug. 19, 2021, and Korean Patent Application No. 10-2022-0093591, filed on Jul. 28, 2022, the entire disclosures of each of which are incorporated herein by reference.

TECHNICAL FIELD

The present disclosure relates to a video coding method and an apparatus using a nonrectangular block splitting structure prediction and transform accordingly.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

The VVC technology improves coding efficiency by supporting a multitype tree that additionally uses a binary tree, a ternary tree, and the like, in addition to a quadtree coding unit (CU) splitting structure, which is the previous HEVC splitting structure. At this time, except for a case to which CU whose size is larger than the maximum size for which transform is performed, intra sub-partitions (ISP) technology, and sub-block transform (STB) technology are applied, transform and prediction are performed based on one unit without distinction between a CU, transform unit (TU), and prediction unit (PU). In the VVC technology, a coding tree unit (CTU) may be split using a quadtree, binary tree, and ternary tree, but there is a restriction that a block split into a binary tree or ternary tree cannot be subsequently split into a quadtree. Therefore, in order to improve video coding efficiency and video quality, a more effective block splitting structure in terms of prediction and transform, in addition to an existing block splitting structure, needs to be considered.

SUMMARY

The present disclosure seeks to provide a video coding method and an apparatus for additionally applying a nonrectangular block splitting structure, in addition to an existing splitting structure, to a current block to improve video coding efficiency and improve video quality. The video coding method and the apparatus generate reference samples according to the applied splitting structure and effectively perform prediction and transform on split blocks.

At least one aspect of the present disclosure provides a method for predicting a block having a size of W×H, performed by a computing device. The method includes obtaining a nonrectangular splitting flag for the block having the size of W×H. Here, W is a width of the block, H is a height of the block, and the nonrectangular splitting flag indicates nonrectangular block splitting for the block. When the nonrectangular splitting flag is true, the method also includes obtaining a nonrectangular splitting index which indicates one of nonrectangular splitting methods. The method also includes determining prediction units by splitting the block having the size of W×H using a nonrectangular splitting method indicated by the nonrectangular splitting index. The method also includes deriving a prediction order of the prediction units. The method also includes obtaining an intra prediction mode for a current block, which is one of the prediction units, according to the prediction order. The method also includes generating a prediction block of the current block using the intra prediction mode.

Another aspect of the present disclosure provides a video decoding apparatus. The apparatus includes a prediction order determiner configured to obtain a nonrectangular splitting flag for a block having a size of W×H. The prediction order determiner is also configured to obtain a nonrectangular splitting index when the nonrectangular splitting flag is true. The prediction order determiner is also configured to split the block having the size of W×H using a nonrectangular splitting method indicated by the nonrectangular splitting index to determine prediction units. Here, W is a width of the block, H is a height of the block, and the nonrectangular splitting flag indicates nonrectangular block splitting for the block. The apparatus also includes a prediction order determiner configured to derive a prediction order of the prediction units. The apparatus also includes a prediction mode determiner configured to obtain an intra prediction mode for a current block, one of the prediction units, according to the prediction order. The apparatus also includes a prediction performer configured to generate a prediction block of the current block using the intra prediction mode.

Yet another aspect of the present disclosure provides a video decoding method of a block having a size of W×H, performed by a video decoding apparatus. The video decoding method includes obtaining a nonrectangular splitting flag from a bitstream for the block having the size of W×H. Here, wherein W is a width of the block, H is a height of the block, and the nonrectangular splitting flag indicates nonrectangular block splitting for the block. When the nonrectangular splitting flag is true, the video decoding method also includes obtaining a nonrectangular splitting index from the bitstream. Here, the nonrectangular splitting index indicates one of nonrectangular splitting methods. The video decoding method also includes determining prediction units by splitting the block having the size of W×H using a nonrectangular splitting method indicated by the nonrectangular splitting index. The video decoding method also includes deriving a prediction order of the prediction units. The video decoding method also includes obtaining an intra prediction mode from the bitstream for a current block, which is one of the prediction units, according to the prediction order. The video decoding method also includes generating a prediction block of the current block using the intra prediction mode.

As described above, the present disclosure provides a video coding method and an apparatus for additionally applying a nonrectangular block splitting structure, in addition to an existing splitting structure, to a current block. The video coding method and the apparatus generate reference samples according to the applied splitting structure and effectively perform prediction and transform on split blocks. Thus, the video coding method and the apparatus improve video coding efficiency and video quality.

DETAILED DESCRIPTION

Figure 1:
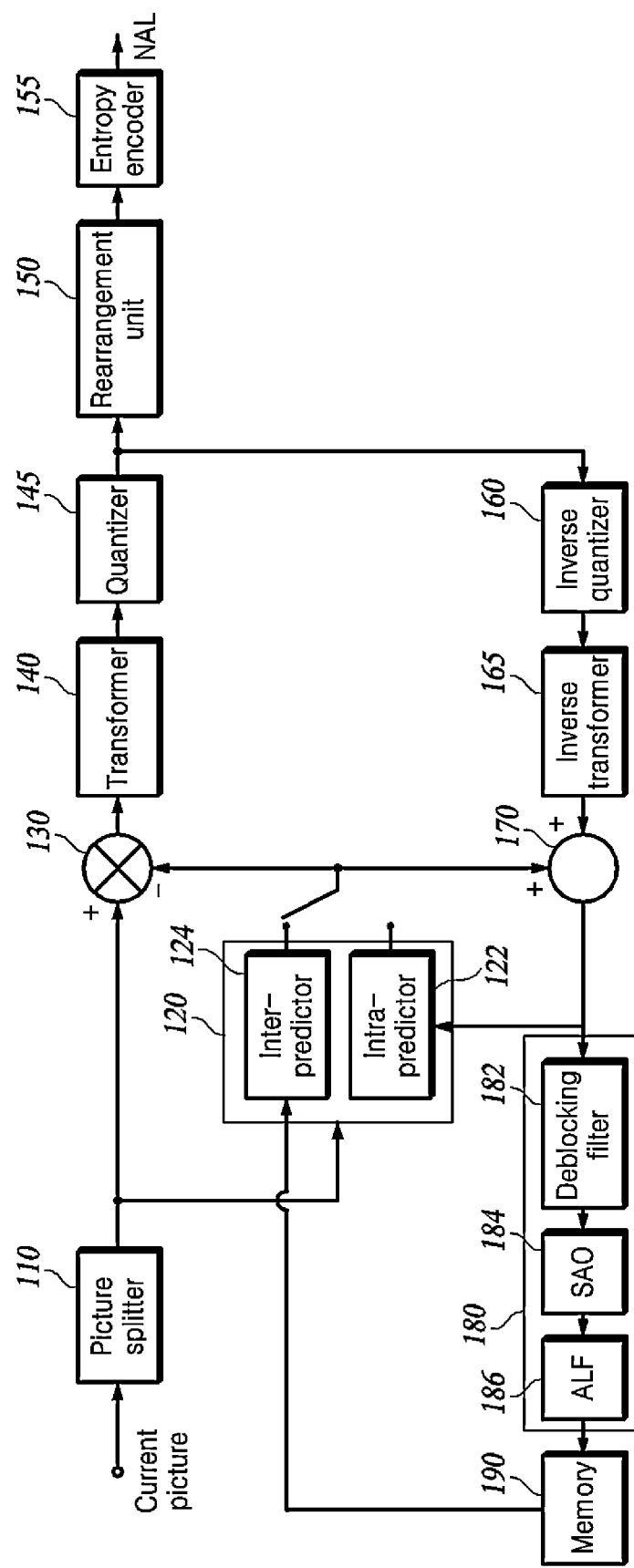
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
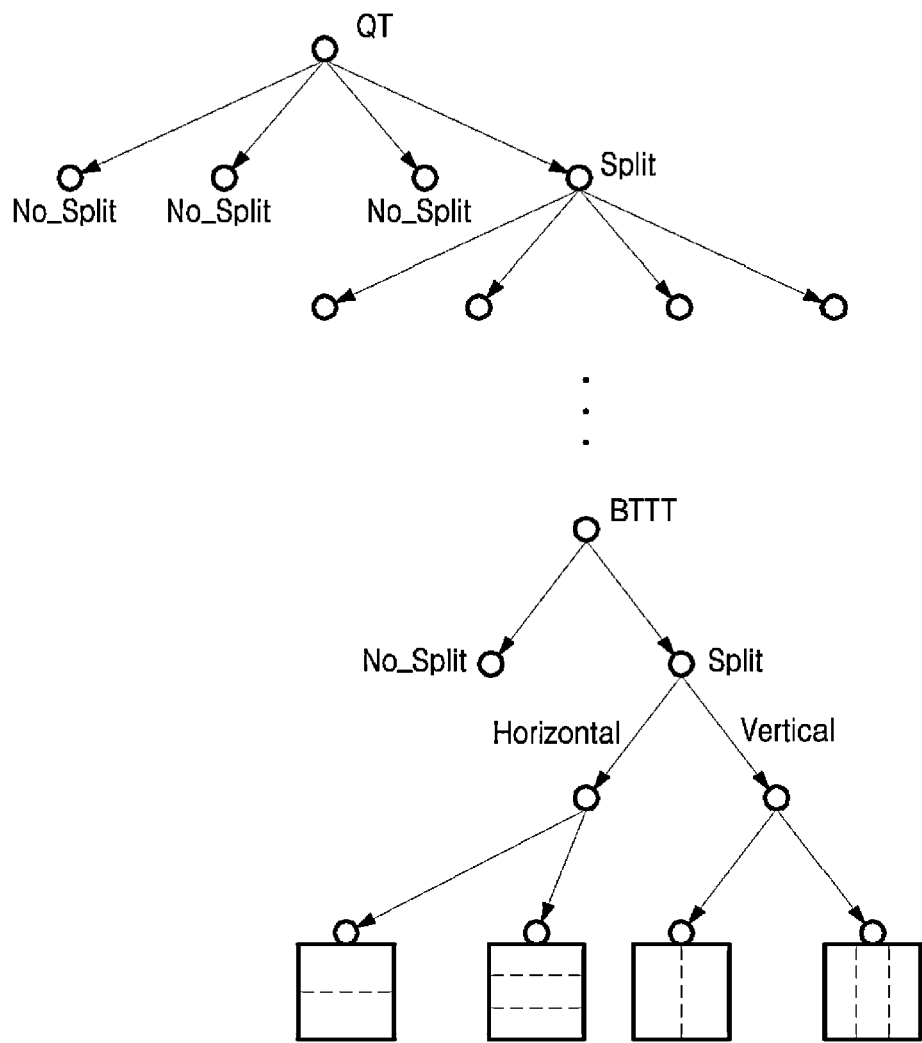
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus.

Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
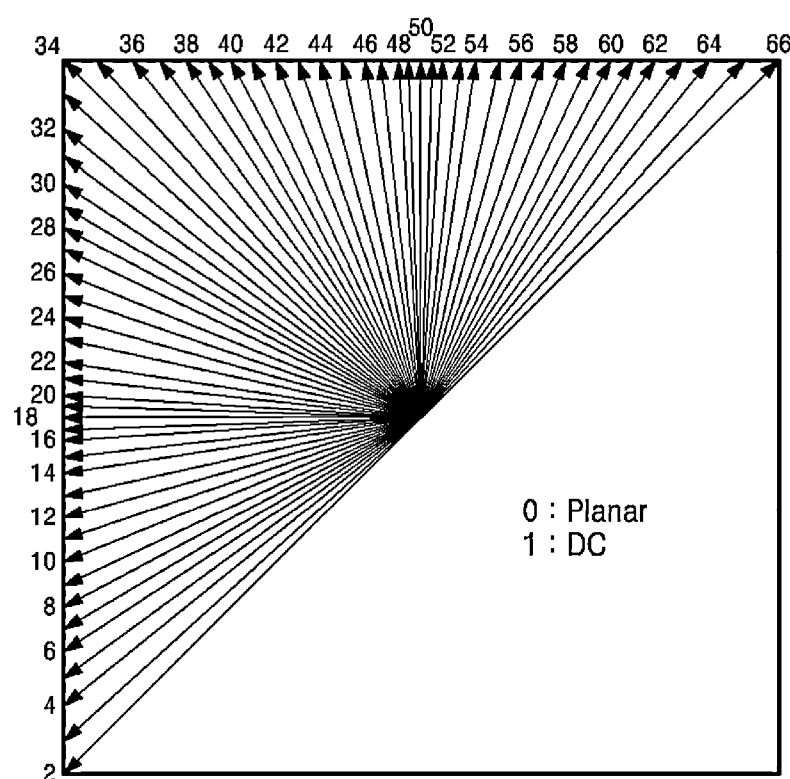
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
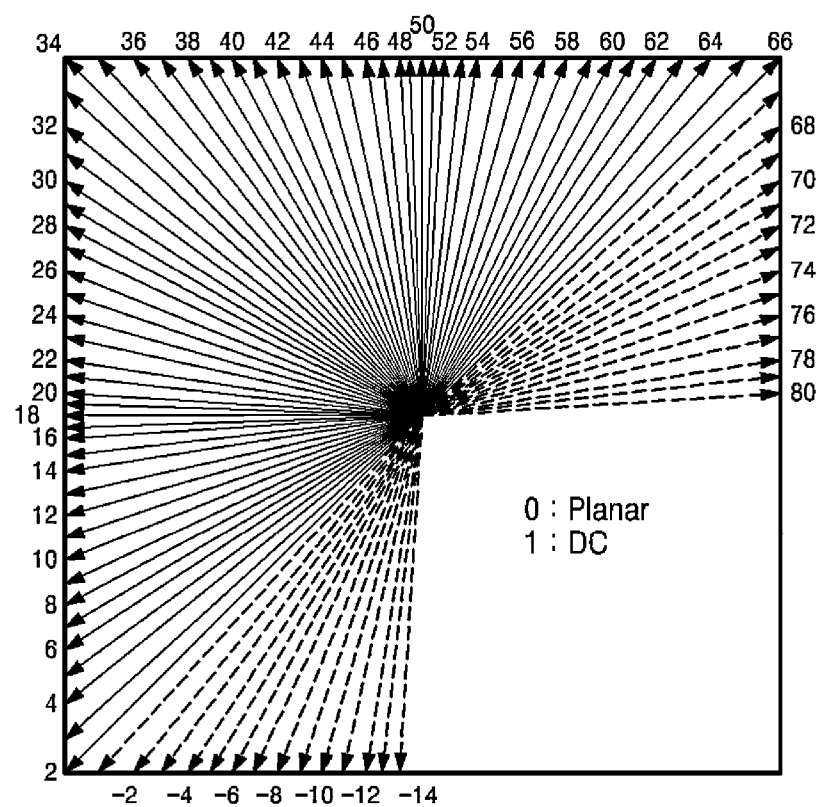

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
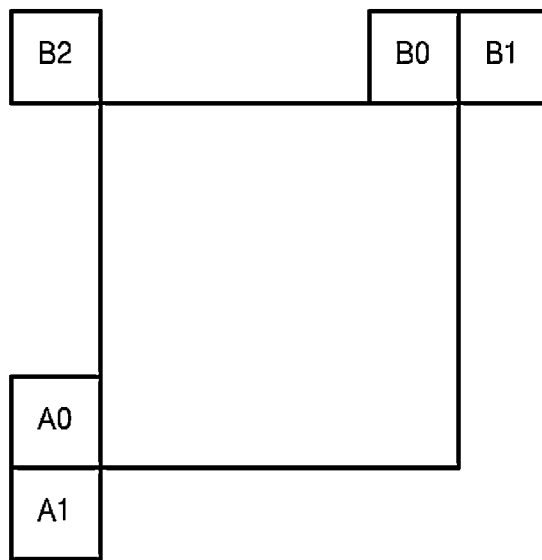
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
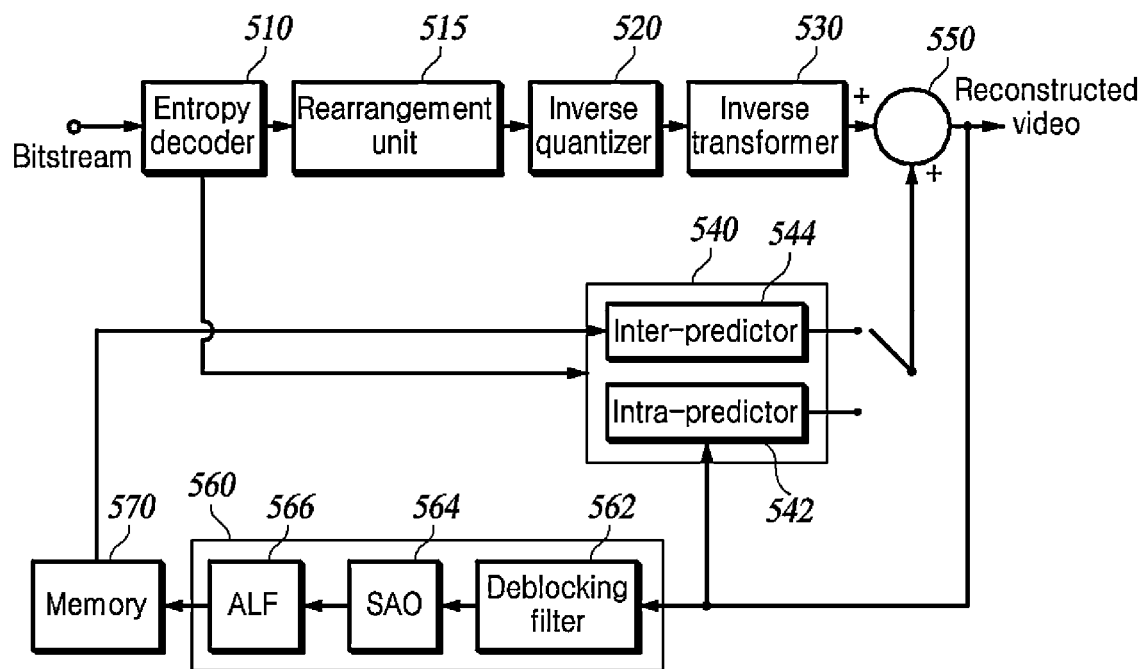
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for additionally applying a nonrectangular block splitting structure, in addition to an existing splitting structure, to a current block. The video coding method and the apparatus generate reference samples according to the applied splitting structure, and effectively perform prediction and transform on split blocks.

The following embodiments may be commonly applied to a predictor 120 in a video encoding apparatus and a predictor 540 in a video decoding apparatus.

In the following description, the term 'target block' to be encoded or decoded may be used in the same meaning as the current block or coding unit (CU) as described above, or the 'target block' may mean a partial region of the coding unit.

In addition, the aspect ratio of a block is defined as a value obtained by dividing a horizontal length of a block by a vertical length

I. Block Splitting Structure of Versatile Video Coding (VVC)

As described above, VVC improves coding efficiency by supporting a multitype tree that additionally uses a binary tree, a ternary tree, and the like, in addition to a quadtree coding unit (CU) splitting structure. In VVC, except for a case to which CU whose size is larger than the maximum size for which transform is performed, intra sub-partitions (ISP) technology, and sub-block transform (STB) technology are applied, transform and prediction are performed based on one unit without distinction between a CU, transform unit (TU), and prediction unit (PU). A coding tree unit (CTU) may be split using a quadtree, binary tree, and ternary tree, but there is a restriction that a block split into a binary tree or ternary tree cannot be subsequently split into a quadtree.

Figure 6:
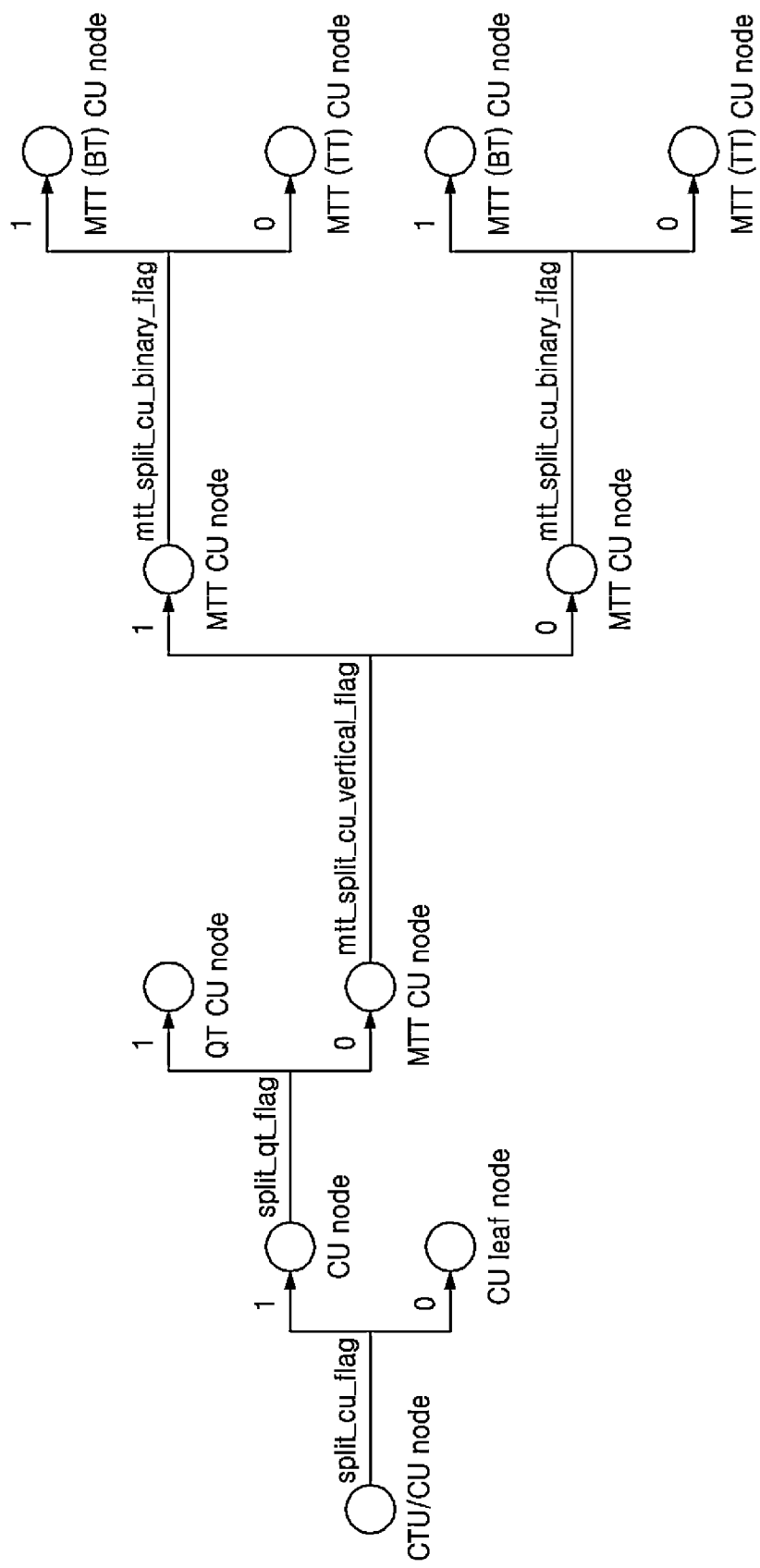
FIG. 6 is a diagram conceptually illustrating a signaling structure of split flags according to a conventional multi-type tree structure.

FIG. 6 is a diagram conceptually illustrating a signaling structure of split flags according to a conventional multitype tree structure.

As illustrated in FIG. 6, when performing block splitting, split_cu_flag is 1. When splitting into a binary tree or ternary tree, split_qt_flag is signaled and parsed as 0, and when splitting into a quad tree, split_qt_flag is signaled and parsed as 1. At this time, mtt_split_cu_vertical_flag, which determines whether to perform vertical splitting to a binary tree or a ternary tree, is signaled and parsed as 1 or 0. If binary tree is performed, mtt_split_cu_binary_flag is signaled and parsed as 1. A syntax of a multitype tree according to the values of the two flags mentioned above is shown in Table 1.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

II. New Block Splitting Structure

Figure 7:
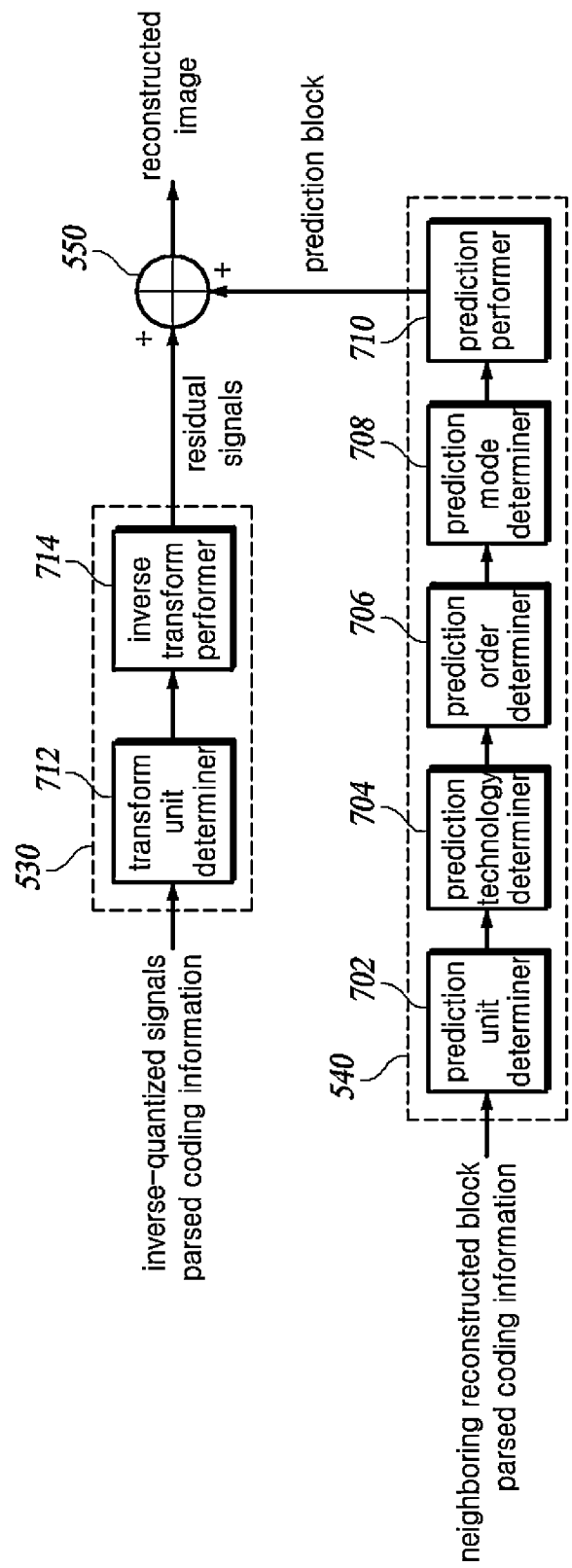
FIG. 7 is a block diagram illustrating in detail a portion of a video decoding apparatus, according to an embodiment of the present disclosure.

FIG. 7 is a block diagram illustrating in detail a portion of a video decoding apparatus, according to an embodiment of the present disclosure.

The video decoding apparatus according to the present embodiment may determine a prediction unit and a transform unit and perform prediction and inverse transformation using a current block corresponding to the determined unit, a determined prediction technology, and a determined prediction mode to finally generate a reconstructed block of the current block. What is illustrated in FIG. 7 may be performed by an inverse transformer 530, a predictor 540, and an adder 550 of the video decoding apparatus. Meanwhile, the operations as illustrated in FIG. 7 may be performed by the inverse transformer 165, the picture splitter 110, the predictor 120, and the adder 170 of the video encoding apparatus. At this time, the video decoding apparatus uses encoding information parsed from a bitstream, but the video encoding apparatus may use information set from a high level in terms of minimizing bit rate distortion. In addition, the video encoding apparatus encodes the set information to generate a bitstream and then transmits the bitstream to the video decoding apparatus. Hereinafter, for convenience, the present embodiment is described based on the video decoding apparatus. As shown in the example of FIG. 5, the predictor 540 includes an intra predictor 542 and an inter predictor 544 depending on the prediction technology. However, as illustrated in FIG. 7, the predictor 540 may include all or some of a prediction unit determiner 702, a prediction technology determiner 704, a prediction order determiner 706, a prediction mode determiner 708, and a prediction performer 710. The prediction unit determiner 702 determines a prediction unit (PU), i.e., the current block. The prediction technology determiner 704 determines a prediction technology (e.g., intra prediction, inter prediction, or intra block copy (IBC) prediction, and the like) for the prediction unit. The prediction order determiner 706 determines a prediction order when the current block is one prediction unit among blocks split from upper blocks. The prediction mode determiner 708 determines a detailed prediction mode for the prediction technology. The prediction performer 710 generates a prediction block of the current block according to the determined prediction order and prediction mode.

The inverse transformer 530 includes a transform unit determiner 712 and an inverse transform performer 714. The transform unit determiner 712 determines a transform unit (TU) for the inverse quantized signals of the current block, and the inverse transform performer 714 inversely transforms the transform unit expressed by the inverse quantized signals to generate residual signals.

The adder 550 adds the prediction block and the residual signals to generate a reconstructed block. The reconstructed block is stored in a memory and may later be used to predict other blocks.

Hereinafter, the operation of each component of the predictor 540 in the block splitting structure proposed in this disclosure is described in detail.

Figure 8:
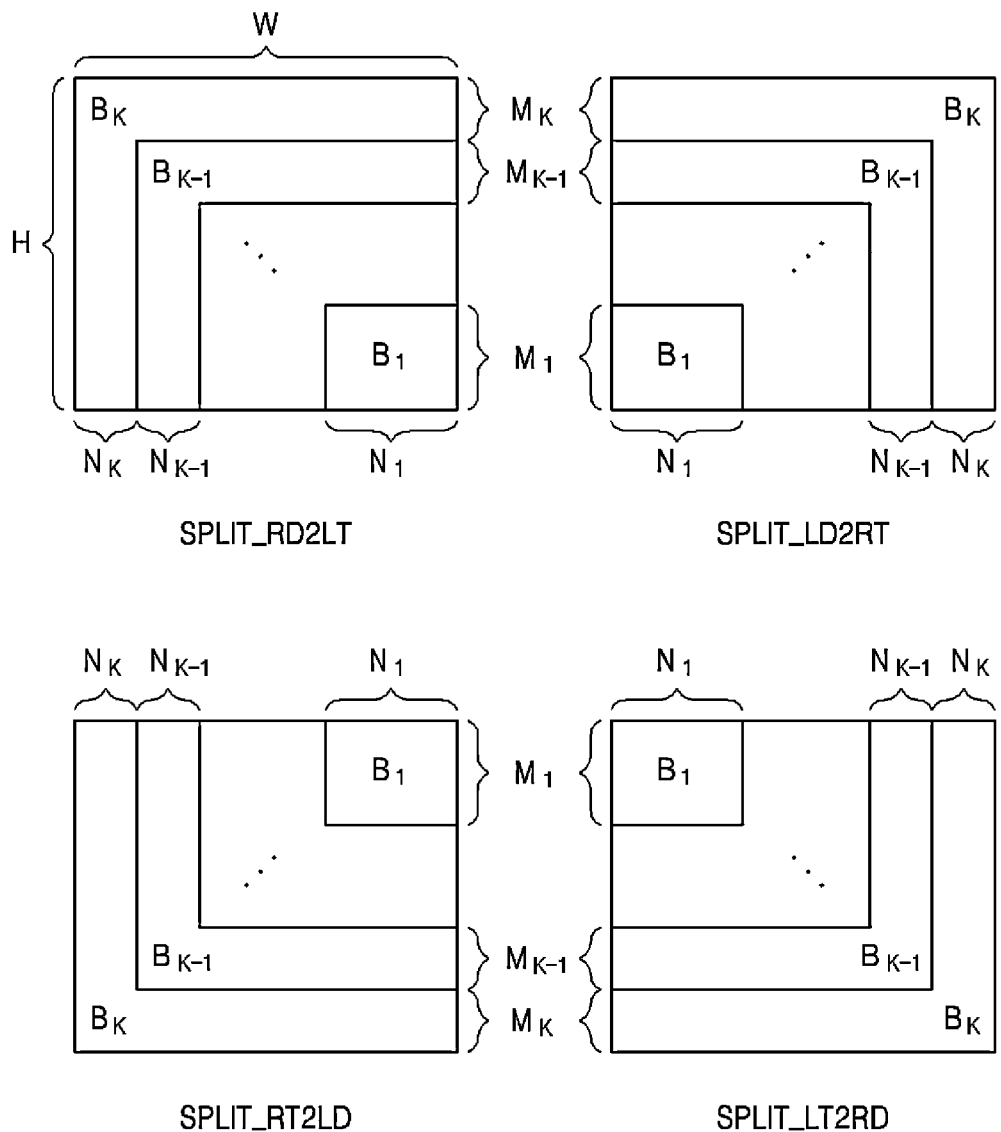
FIG. 8 is a diagram illustrating a nonrectangular block splitting structure, according to an embodiment of the present disclosure.

The prediction unit determiner 702 may determine a prediction unit using a nonrectangular block splitting structure as shown in FIG. 8 in addition to the existing block splitting structure.

FIG. 8 is a diagram illustrating a nonrectangular block splitting structure, according to an embodiment of the present disclosure.

As shown in the example of FIG. 8, the prediction unit determiner 702 may determine a prediction unit based on the nonrectangular block splitting structures of SPLIT_RD2LT, SPLIT_LD2RT, SPLIT_RT2LD, and SPLIT_LT2RD. According to the block splitting structure, a prediction unit may be determined for a block having a size of W×H. Here, W represents a width of a block, and H represents a height of the block. Hereinafter, rectangles include squares.

As an example, for a block having the size W×H, a prediction unit according to block splitting may be generated as follows. First, 1 or more natural numbers $N_1, N_2, \ldots, N_K$ satisfying $N_1+N_2+ \ldots +N_K=W$ and 1 or more natural numbers $M_1, M_2, \ldots, M_K$ satisfying $M_1+M_2+ \ldots +M_K=H$ are defined. A rectangular block $B_1$ that has a size of $N_1 \times M_1$ and is located at the bottom right, bottom left, top right, or top left of the block is defined. Thereafter, for k (here, $2 \le k \le K$), the nonrectangular block $B_k$ is defined as follows. In a rectangular block having a size $(N_1+N_2+ \ldots +N_k) \times (M_1+M_2+ \ldots +M_k)$ located at the bottom right, bottom left, top right, or top left of the block, a block having an L-shape, except for $B_1, B_2, \ldots, B_{k-1}$, is defined as $B_k$. In this way, the prediction unit determiner 702 may determine a prediction unit of $B_1, B_2, \ldots, B_K$ as shown in the example of FIG. 8. At this time, according to embodiments, all four block splitting methods illustrated in FIG. 8 may be allowed, or only n (where n is a natural number of 4 or less) block splitting methods may be used.

In addition, in the nonrectangular splitting methods illustrated in FIG. 8, K is an agreed value according to W and H, which are block sizes before splitting, and may be, for example, a common divisor of W and H.

Meanwhile, the video decoding apparatus may receive signaling from the video encoding apparatus a flag (hereinafter referred to as 'nonrectangular splitting flag') indicating such block splitting and an index indicating one of n block splitting methods. For example, if the conditions of '$W_{MIN} \le W \le W_{MAX}$' and '$H_{MIN} \le H \le H_{MAX}$' are satisfied for a block of the size W×H, a nonrectangular splitting flag may be signaled. Meanwhile, if these conditions are not satisfied, the nonrectangular splitting flag is not signaled and thus the splitting methods illustrated in FIG. 8 are not applied. Here, $W_{MIN}$, $W_{MAX}$, $H_{MIN}$, and $H_{MAX}$ may be determined according to the resolution of a video to be encoded/decoded.

The nonrectangular splitting methods illustrated in FIG. 8 may be applied to a parent-node or leaf-node in the split flag signaling structure illustrated in FIG. 6.

As another example, after a prediction unit according to nonrectangular splitting methods is determined, splitting may be performed on $B_1$ into a quadtree. Alternatively, only other multi-type tree splitting with excluding quad-tree splitting may be performed on $B_1$.

As another example, nonrectangular splitting methods may be applied to a luma component. Alternatively, the nonrectangular splitting methods may be applied to both luma and chroma components.

As another example, a block having the size of W×H may be determined as one prediction unit without applying a block splitting method.

The prediction technology determiner 704 may determine a prediction technology for $B_1, B_2, \ldots, B_K$ according to the nonrectangular block splitting or an unsplit block according to an agreement between the video encoding apparatus and the video decoding apparatus. Here, the prediction technology applied to each block may be intra prediction, inter prediction, IBC prediction, or other prediction technology.

For example, in the case of P(Predictive)-slice or B(Bi-predictive)-slice, the technology of $B_1$ may be implicitly determined by inter prediction or IBC prediction, and prediction technology of $B_2, \ldots, B_K$ may be implicitly determined by intra prediction. In addition, in the case of I(Intra)-slice, the technology of $B_1$ may be implicitly determined by IBC prediction, and prediction technology of $B_2, \ldots, B_K$ may be implicitly determined by intra prediction.

The prediction order determiner 706 determines a prediction order for $B_1, B_2, \ldots, B_K$. At this time, for the index N of $B_N$ where $1 \le N \le K$, the prediction order may be descending or ascending.

As another example, according to the nonrectangular splitting method illustrated in FIG. 8, the prediction order may be fixed. For example, in the case of splitting into $B_1, B_2, \ldots, B_K$ according to the SPLIT_RD2LT splitting structure, the prediction order may be implicitly fixed in descending order of $B_K \to B_{K-1} \to \ldots \to B_1$. Alternatively, in the case of splitting into $B_1, B_2, \ldots, B_K$ according to the SPLIT_LD2RT splitting structure, the prediction order may be implicitly fixed in ascending order of $B_1 \to B_2 \to \ldots \to B_K$.

Alternatively, in the case of splitting into $B_1, B_2, \ldots, B_K$ according to the SPLIT_RT2LD splitting structure, the prediction order may be implicitly fixed in descending order of $B_K \to B_{K-1} \to \ldots \to B_1$. Alternatively, in the case of splitting into $B_1, B_2, \ldots, B_K$ according to the SPLIT_LT2RD splitting structure, the prediction order may be implicitly fixed in ascending order of $B_1 \to B_2 \to \ldots \to B_K$.

As another example, the prediction order may be a random order rather than a fixed order according to the splitting structure. The prediction order determiner 706 may receive signaled block indices according to the prediction order and then may parse the block indices.

As another example, the prediction order may be determined according to signaling of a 1-bit flag indicating the prediction order.

Hereinafter, the operations of the prediction mode determiner 708 and the prediction performer 710 for inter prediction and intra prediction are described.

The inter predictor 544 of the predictor 540 performs the following operations using the prediction mode determiner 708 and the prediction performer 710 to perform inter prediction.

The prediction mode determiner 708 parses the prediction mode to be used for prediction of the current block among the inter prediction modes. Prediction modes include a merge mode and AMVP, and these inter prediction modes may be parsed by a mode index. In the case of a chroma component, the same prediction mode as that of the luma component may be parsed, and information on the corresponding prediction mode may also be parsed by an index.

Figure 9:
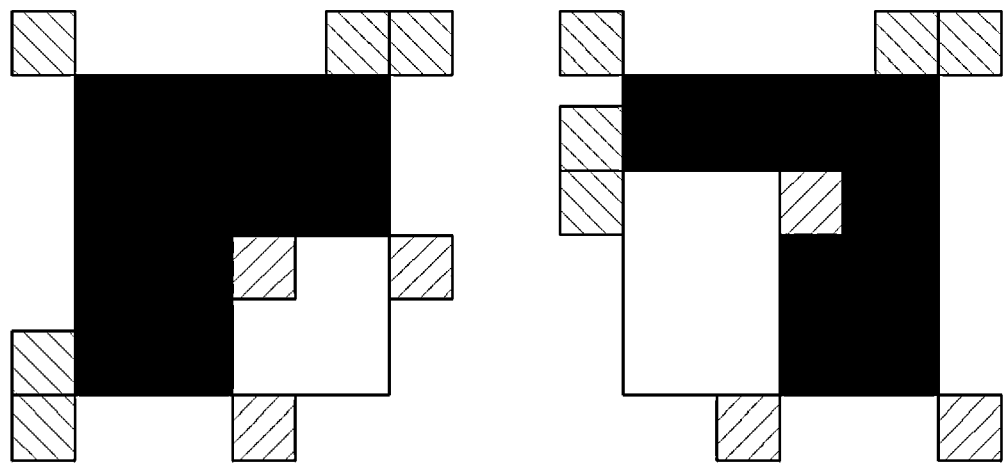
FIG. 9 is a diagram illustrating positions for configuring a motion vector candidate list for a nonrectangular block, according to an embodiment of the present disclosure.
Figure 9:
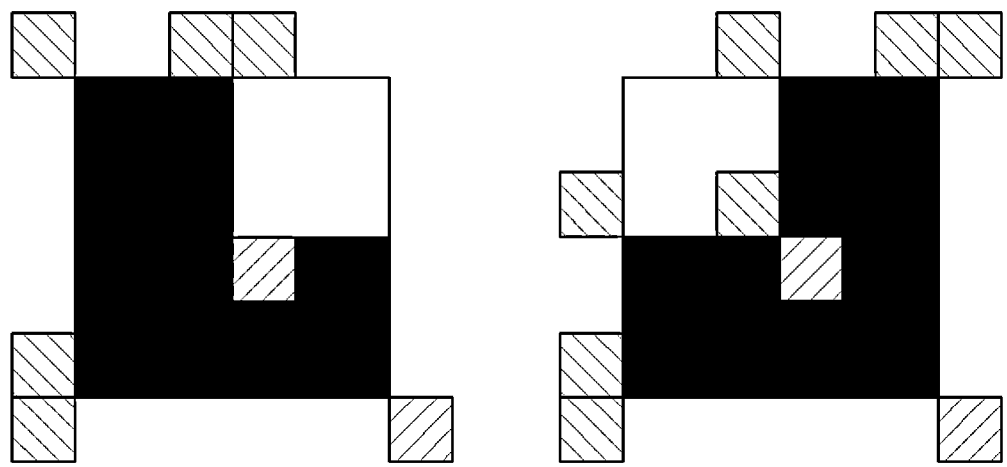
Figure 9:
Figure 9:

FIG. 9 is a diagram illustrating positions for configuring a motion vector candidate list for a nonrectangular block, according to an embodiment of the present disclosure.

The prediction performer 710 configures a motion vector candidate list according to the parsed prediction mode. For the nonrectangular block splitting methods illustrated in FIG. 8, the prediction performer 710 may configure a motion vector candidate list as shown in the example of FIG. 9.

As in the example of FIG. 8, among the K split blocks of prediction units $B_1, B_2, \ldots, B_K, B_N$, where $1 \leq N \leq K$, is assumed.

First, when an upper block is split into K prediction units according to the SPLIT_RD2LT splitting structure and the prediction order is $B_K \to B_{K-1} \to \ldots \to B_1$, the prediction performer 710 may configure a motion vector candidate in the sample positions indicated in ⓐ of FIG. 9. Alternatively, when an upper block is split into K prediction units according to the SPLIT_LD2RT splitting structure and the prediction order is $B_1 \to B_2 \to \ldots \to B_K$, the prediction performer 710 may configure a motion vector candidate in the sample positions indicated in ⓑ of FIG. 9.

Alternatively, when an upper block is split into K prediction units according to the SPLIT_RT2LD splitting structure and the prediction order is $B_K \to B_{K-1} \to \ldots \to B_1$, the prediction performer 710 may configure a motion vector candidate in the sample positions indicated in ⓒ of FIG. 9. Alternatively, when an upper block is split into K prediction units according to the SPLIT_LT2RD splitting structure and the prediction order is $B_1 \to B_2 \to \ldots \to B_K$, the prediction performer 710 may configure a motion vector candidate in the sample positions indicated in ⓓ of FIG. 9.

The prediction performer 710 may search each candidate list using a search order defined according to a prior agreement between the video encoding apparatus and the video decoding apparatus. Alternatively, the prediction performer 710 may search each candidate list using signaling and the parsed search order.

Thereafter, the prediction performer 710 may select a motion vector from the motion vector candidate list and may generate a prediction block of the current block using the selected motion vector.

Figure 10:
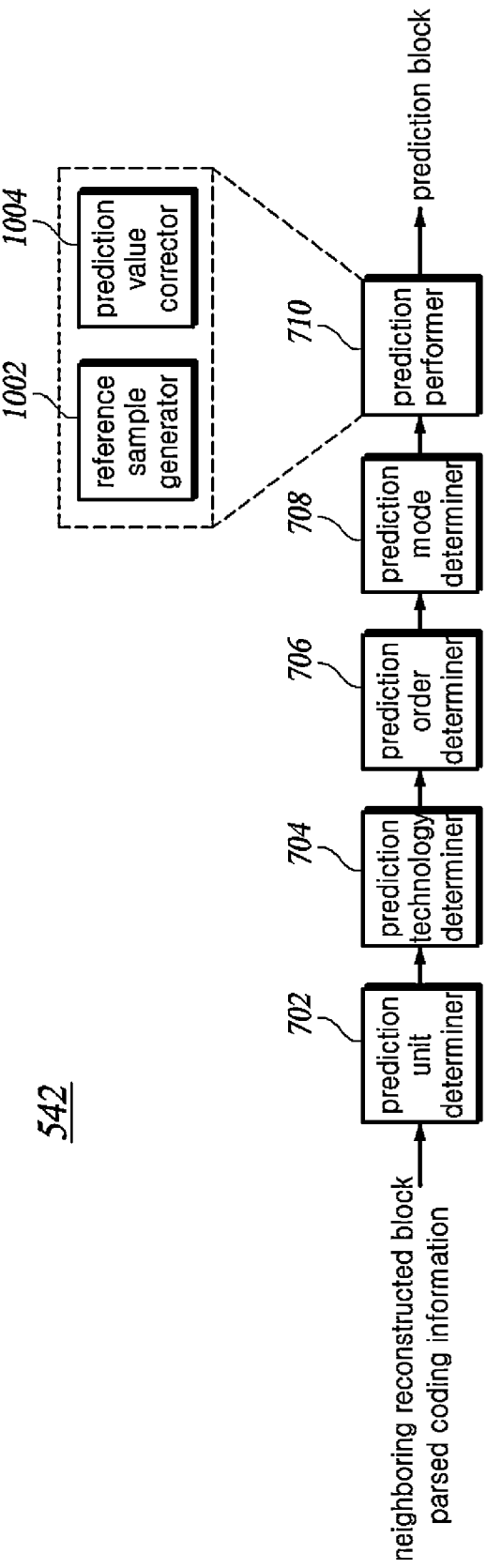
FIG. 10 is a block diagram conceptually illustrating an intra predictor, according to an embodiment of the present disclosure.

FIG. 10 is a block diagram conceptually illustrating an intra predictor, according to an embodiment of the present disclosure.

The intra predictor 542 of the predictor 540 performs the following operations using the prediction mode determiner 708 and the prediction performer 710 to perform intra prediction.

The prediction mode determiner 708 parses the prediction mode to be used for prediction of the current block among the intra prediction modes. Prediction modes include DC, Planar, and directional modes, as illustrated in FIG. 3A. The intra prediction mode may be parsed using a mode index or derived using the prediction mode of neighboring blocks. In the case of a chroma component, the same prediction mode as that of the luma component may be parsed, and information on the corresponding prediction mode may also be parsed by an index.

The prediction performer 710 generates reference samples and intra-predicts the current block using the generated reference samples and thus generates a prediction block. In addition, the prediction performer 710 may perform correction on samples within the prediction block. To this end, as shown in the example of FIG. 10, the prediction performer 710 may additionally include a reference sample generator 1002 and a prediction value corrector 1004.

Figure 11:
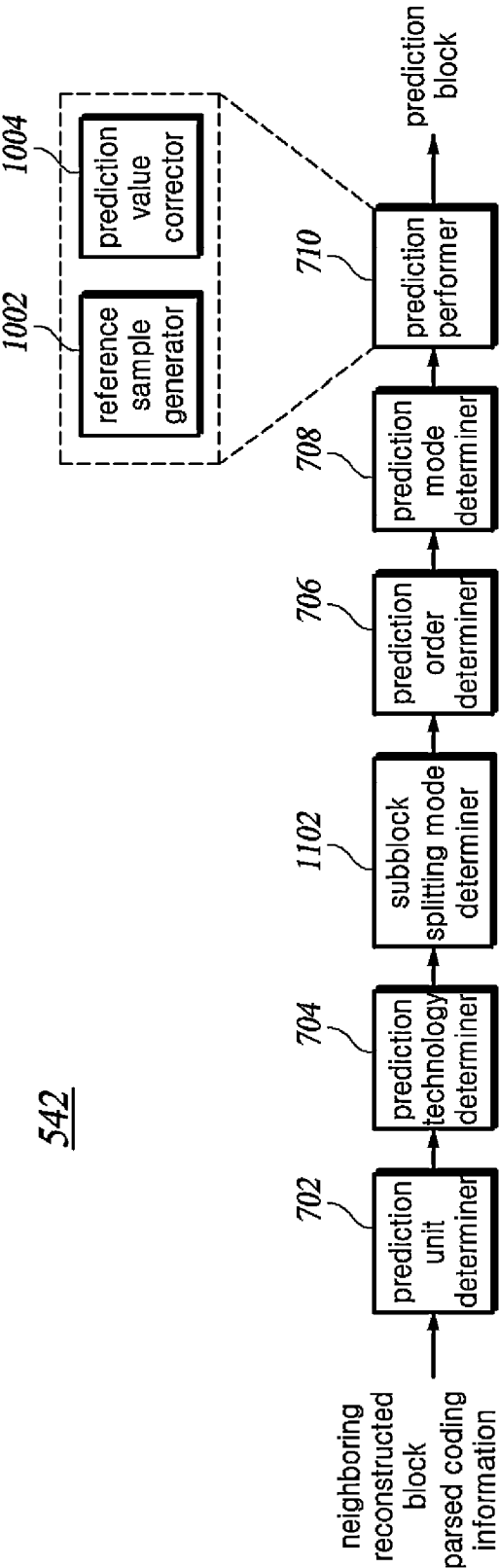
FIG. 11 is a block diagram conceptually illustrating an intra predictor using subblock splitting, according to another embodiment of the present disclosure.

FIG. 11 is a block diagram conceptually illustrating an intra predictor using subblock splitting, according to another embodiment of the present disclosure.

Meanwhile, when predicting the current block using the intra prediction mode, the intra predictor 542 may split the current block into subblocks and may perform reconstruction per subblock basis. To this end, as shown in the example of FIG. 11, the intra predictor 542 may additionally include a subblock splitting mode determiner 1102. Meanwhile, in the example of FIG. 11, the order of components may be changed, and each component may be omitted.

The prediction unit determiner 702 obtains the current block, which is a rectangular block, as a prediction unit, and the prediction technology determiner 704 determines the prediction of the current block as intra prediction.

The subblock splitting mode determiner 1102 parses information indicating whether to perform prediction and reconstruction per subblock basis while the current block is split into subblocks. As shown in the example of FIG. 8, the current block may be split into subblocks according to the splitting methods of SPLIT_RD2LT, SPLIT_LD2RT, SPLIT_RT2LD, and SPLIT_LT2RD. Alternatively, the current block may be split into multiple square blocks or rectangular blocks. In this case, the number of subblocks, splitting direction, and splitting method may be limited depending on the aspect ratio and position of the current block.

For split subblocks, the prediction order determiner 706 parses information indicating prediction per subblock basis and reconstruction order.

When performing prediction per subblock basis, the prediction mode determiner 708 parses information on the prediction mode per subblock basis. At this time, a different prediction mode may be used for each subblock. Alternatively, the same prediction mode may be used for all subblocks. Alternatively, after the prediction mode of the current block is parsed, the parsed prediction mode may be applied to all subblocks.

Hereinafter, examples in which the prediction mode determiner 708 limits the prediction mode when the current block is predicted according to the intra prediction mode are described. Here, the current block is one of the prediction units into which an upper block having the size of W×H is split according to the methods illustrated in FIG. 8, and the current block may be sequentially intra-predicted according to the prediction order. Alternatively, the current block is a block having the size of W×H and may be split into subblocks according to the methods illustrated in FIG. 8. At this time, each subblock may be sequentially intra-predicted according to the prediction order.

The prediction mode determiner 708 may limit the prediction mode according to prior agreement between the video encoding apparatus and the video decoding apparatus for each splitting method. At this time, the agreement between the video encoding apparatus and the video decoding apparatus may be determined by the size and/or aspect ratio of the current block. Alternatively, a flag is signaled from the video encoding apparatus to limit the intra prediction mode, and the video decoding apparatus may parse the flag to determine the restriction of the prediction mode. Alternatively, the restriction of the prediction mode may be omitted.

Figure 12:
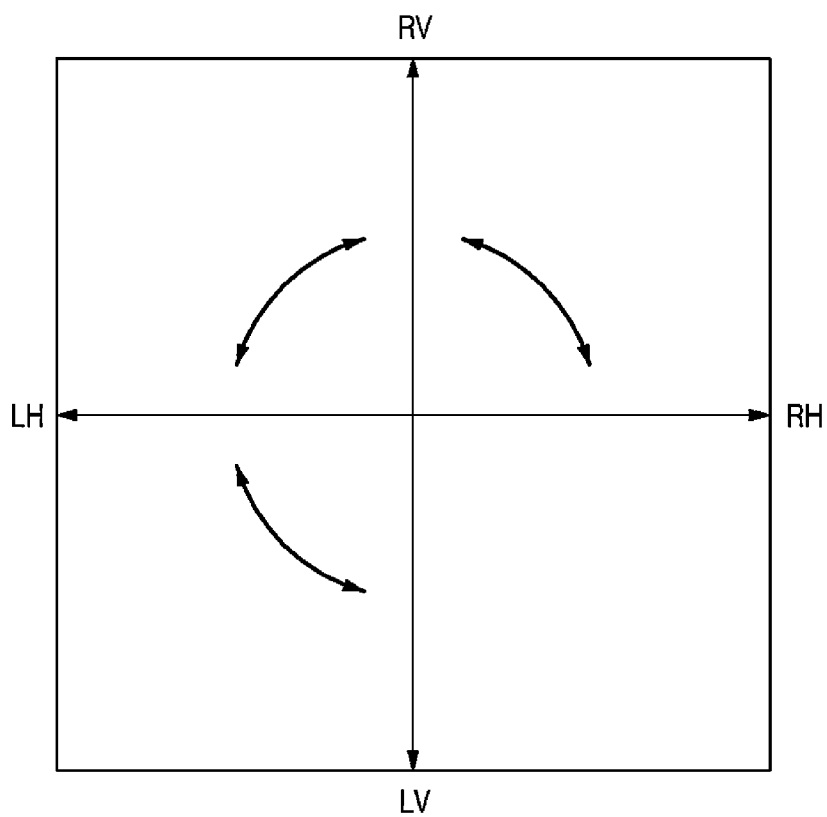
FIG. 12 is a diagram illustrating splitting of directional prediction modes of intra prediction.

As an example, for a nonrectangular current block among blocks obtained by splitting an upper block according to the SPLIT_LD2RT splitting structure or for subblocks obtained by splitting the current block according to the SPLIT_LD2RT splitting structure, when the prediction order is $B_1 \rightarrow B_2 \rightarrow \ldots \rightarrow B_K$, available prediction modes may be limited to DC, Planar, and directional modes between LH and LV in the example of FIG. 12. At this time, the LH method, i.e., the horizontal direction prediction mode, may not be included.

Alternatively, for a nonrectangular current block among blocks obtained by splitting an upper block according to the SPLIT_RT2LD splitting structure or for subblocks obtained by splitting the current block according to the SPLIT_RT2LD splitting structure, when the prediction order is $B_K \rightarrow B_{K-1} \rightarrow \ldots \rightarrow B_1$, the available prediction modes may be limited to DC, Planar, and directional modes between LH and LV in the example of FIG. 12. At this time, the LH method, i.e., the horizontal direction prediction mode, may not be included.

Alternatively, for a nonrectangular current block among blocks obtained by splitting an upper block according to the SPLIT_LT2RD splitting structure or for subblocks obtained by splitting the current block according to the SPLIT_LT2RD splitting structure, when the prediction order is the prediction order is $B_1 \rightarrow B_2 \rightarrow \ldots \rightarrow B_K$, the prediction modes may be limited to DC, Planar, and directional modes between RV and LH in the example of FIG. 12. At this time, the RV and LH methods, i.e., the vertical direction prediction mode and the horizontal direction prediction mode, may not be included.

Alternatively, for a nonrectangular current block among blocks obtained by splitting an upper block according to the SPLIT_RD2LT splitting structure or for subblocks obtained by splitting the current block according to the SPLIT_RD2LT splitting structure, when the prediction order is the prediction order is $B_K \rightarrow B_{K-1} \rightarrow \ldots \rightarrow B_1$, the prediction mode may be limited to DC, Planar, and directional modes between RV and LH in the example of FIG. 12. At this time, the RV and LH methods, i.e., the vertical direction prediction mode and the horizontal direction prediction mode, may not be included.

Hereinafter, examples in which the prediction performer 710 predicts the current block when a prediction mode is not a limited prediction mode are described.

As an embodiment, when a prediction mode not included in the limited prediction modes as described above is signaled and parsed, the prediction performer 710 may determine an available prediction mode by implicitly rotating 90 degrees and/or 180 degrees and then may perform intra prediction according to the determined prediction mode.

As another embodiment, if a prediction mode according to a most probable mode (MPM) is parsed from the prediction mode determiner 708 but the parsed prediction mode is not a limited prediction mode, the prediction performer 710 may replace the parsed prediction mode with a different prediction mode included in the limited prediction modes and perform intra prediction using the replaced prediction mode.

Meanwhile, when the current block having the size of W×H is split according to the proposed block splitting method and the nonrectangular block is determined in the intra prediction mode, the prediction mode determiner 708 may apply the prediction mode restriction described above depending on a shape of the block.

Hereinafter, examples in which the reference sample generator 1002 generates reference samples of the current block when the current block is predicted according to the intra prediction mode are described. Here, the current block may be a block having the size of W×H. The current block may be one of the prediction units obtained by splitting an upper block having the size of W×H according to the methods illustrated in FIG. 8 or the multi-type tree splitting method. Alternatively, the current block may be a block having the size of W×H and may be split into subblocks according to the methods illustrated in FIG. 8 or the multi-type tree splitting method.

As an example, when a reference sample does not exist in a neighboring position of the current block, the reference sample generator 1002 may use a sample value at the position closest to the corresponding neighboring position as the reference sample.

As another example, when the current block is located at the border of the picture or there is no reference sample at a neighboring position, the reference sample generator 1002 may use the intermediate value of expressible brightness values as the reference sample value.

Figure 13:
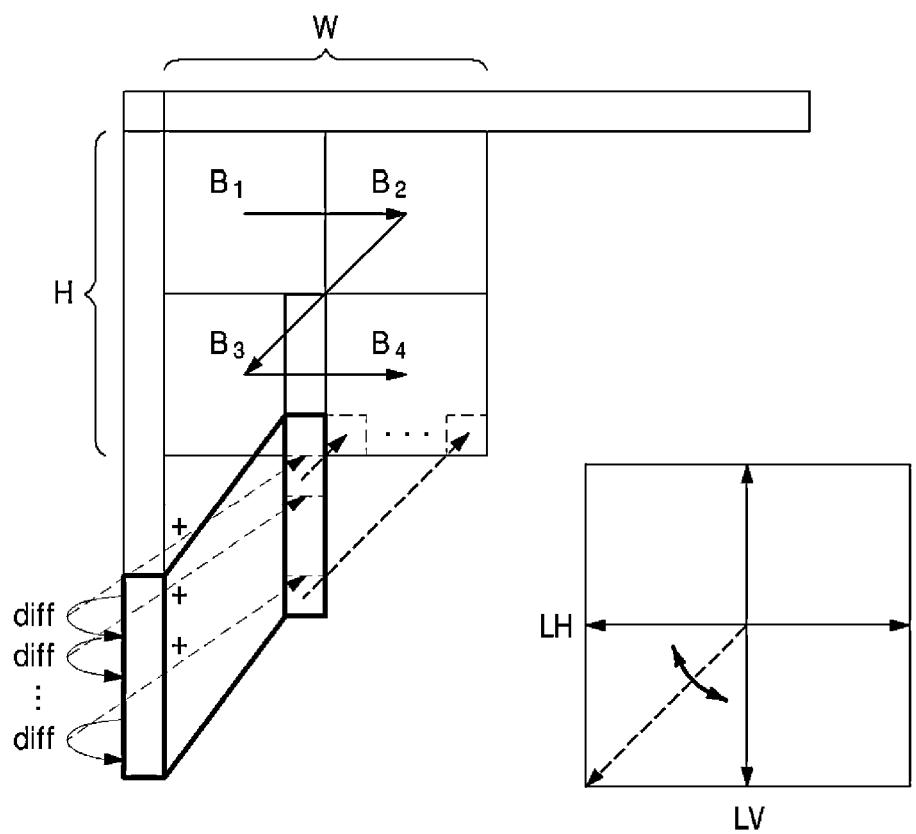
FIGS. 13-16 are diagrams illustrating the generation of reference samples, according to an embodiment of the present disclosure.

As an example, as shown in the example of FIG. 13, when a block having the size of W×H is split into blocks $B_1$, $B_2$, $B_3$, and $B_4$, and when block $B_4$ is predicted according to a directional prediction mode of the intra prediction mode after prediction and reconstruction of blocks $B_1$, $B_2$, and $B_3$, the reference sample generator 1002 may generate a reference sample necessary for prediction of the block $B_4$ from the reconstructed signals. In other words, when the block $B_4$ is predicted according to the directional prediction mode between the LV direction and the LH direction, a reference sample may be generated as in the following example.

In order to apply the directional prediction mode to the block $B_4$, the reference sample generator 1002 may generate the necessary neighboring reference samples using samples in the reconstructed block $B_2$. At this time, if there is no reconstructed sample at the position of the reference sample required for prediction, the value of the closest sample may be copied to the required number of reference samples.

In addition, in the case of wide-angle intra prediction, the reference sample generator 1002 may generate a reference sample located in a 180-degree reversed direction of the directional prediction mode of the block $B_4$ from the left block of the reconstructed current block. At this time, when the reference sample at the corresponding position cannot be obtained from the reconstructed sample, the value of the closest available sample may be copied as the reference sample.

In addition, the reference sample generator 1002 may compensate the copied reference sample value as follows. As shown in the example of FIG. 13, the reference sample generator 1002 calculates difference signals between adjacent samples using samples obtained from the left block of the block having the size of W×H. Thereafter, the reference sample generator 1002 may compensate the reference samples to be used for prediction of the block $B_4$ by adding the difference signals to copied reference samples among the reference samples of the block $B_4$.

Figure 14:
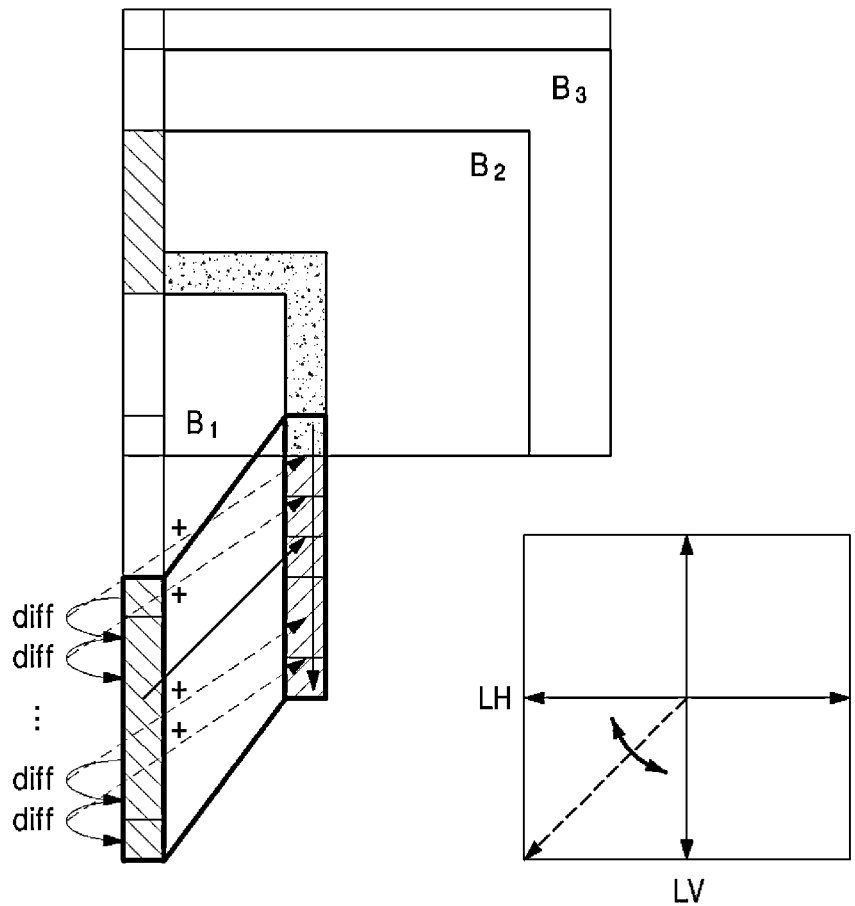

As another embodiment, as in the example of FIG. 14, it is assumed that the block having the size of W×H is split into three blocks according to the SPLIT_LD2RT splitting structure and each block is a current block or a subblock. In addition, the prediction order is $B_1 \rightarrow B_2 \rightarrow B_3$, and after reconstruction of the block $B_1$, the block $B_2$ is predicted according to the directional prediction mode of the intra prediction mode. At this time, the reference sample generator 1002 may generate a reference sample necessary for prediction of the block $B_2$ from the reconstructed signals. In other words, a reference sample may be generated for intra prediction of the block $B_2$ according to the directional prediction mode between the LV direction and the LH direction, as shown in the following example.

In order to apply the directional prediction mode to the block $B_2$, the reference sample generator 1002 may generate the necessary neighboring reference samples using the reconstructed samples on the left of the block having the size of W×H or the samples in the reconstructed block $B_1$. At this time, for positions at the bottom of the block $B_1$ in which the reconstructed reference sample cannot be used, the value of the closest sample may be copied as many times as necessary.

In addition, in the case of wide-angle intra prediction, the reference sample generator 1002 may generate a reference sample located in a 180 degrees reversed direction of the directional prediction direction of the block $B_2$ from the left block of the reconstructed current block. At this time, when the reference sample at the corresponding position cannot be obtained from the reconstructed sample, the value of the closest available sample may be copied.

In addition, the reference sample generator 1002 may compensate the copied sample value as follows. As shown in the example of FIG. 14, the reference sample generator 1002 calculates difference signals between adjacent samples using samples obtained from the left block of block having the size of W×H. Thereafter, the reference sample generator 1002 may compensate the reference samples to be used for prediction of the block $B_2$ by adding the difference signals to copied samples among the reference samples of the block $B_2$.

Figure 15:
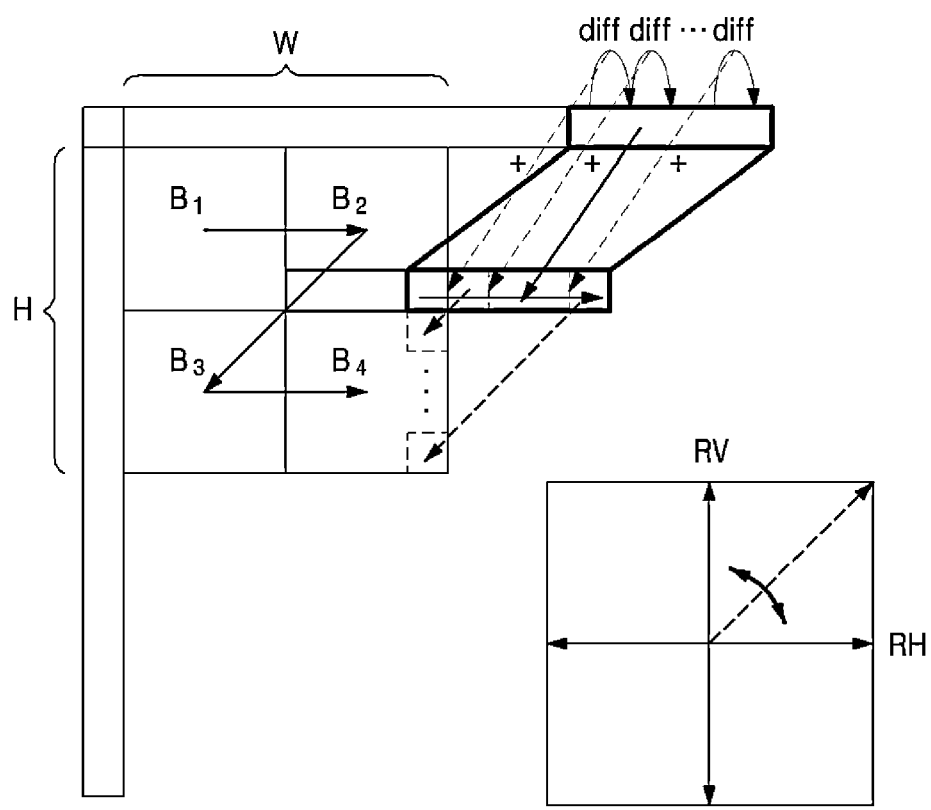

As another embodiment, as shown in the example of FIG. 15, when the block having the size of W×H is split into $B_1$, $B_2$, $B_3$, and $B_4$, and when the block $B_4$ is predicted according to the directional prediction mode of the intra prediction mode after prediction and reconstruction of the blocks $B_1$, $B_2$, and $B_3$, the reference sample generator 1002 may generate a reference sample necessary for prediction of the block $B_4$ from the reconstructed signals. In other words, when the block $B_4$ is predicted according to the directional prediction mode between the RV direction and the RH direction, a reference sample may be generated as in the following example.

In order to apply the directional prediction mode to the block $B_4$, the reference sample generator 1002 may generate the necessary neighboring reference samples using samples in the reconstructed block $B_2$. At this time, if there is no reconstructed sample at the position of the reference sample required for prediction, the value of the closest sample may be copied to the required number of reference samples.

In addition, in the case of wide-angle intra prediction, the reference sample generator 1002 may generate a reference sample located in a 180-degree reversed direction of the directional prediction mode of the block $B_4$ from the top block of the reconstructed current block. At this time, if the reference sample at the corresponding position cannot be obtained from the reconstructed sample, the value of the closest available sample may be copied as the reference sample.

In addition, the reference sample generator 1002 may compensate the copied reference sample value as follows. As shown in the example of FIG. 15, the reference sample generator 1002 calculates difference signals between adjacent samples using samples obtained from the top block of the block having the size of W×H included in the current block. Thereafter, the reference sample generator 1002 may compensate the reference samples to be used for prediction of the block $B_4$ by adding the difference signals to copied reference samples among the reference samples of the block $B_4$.

Figure 16:
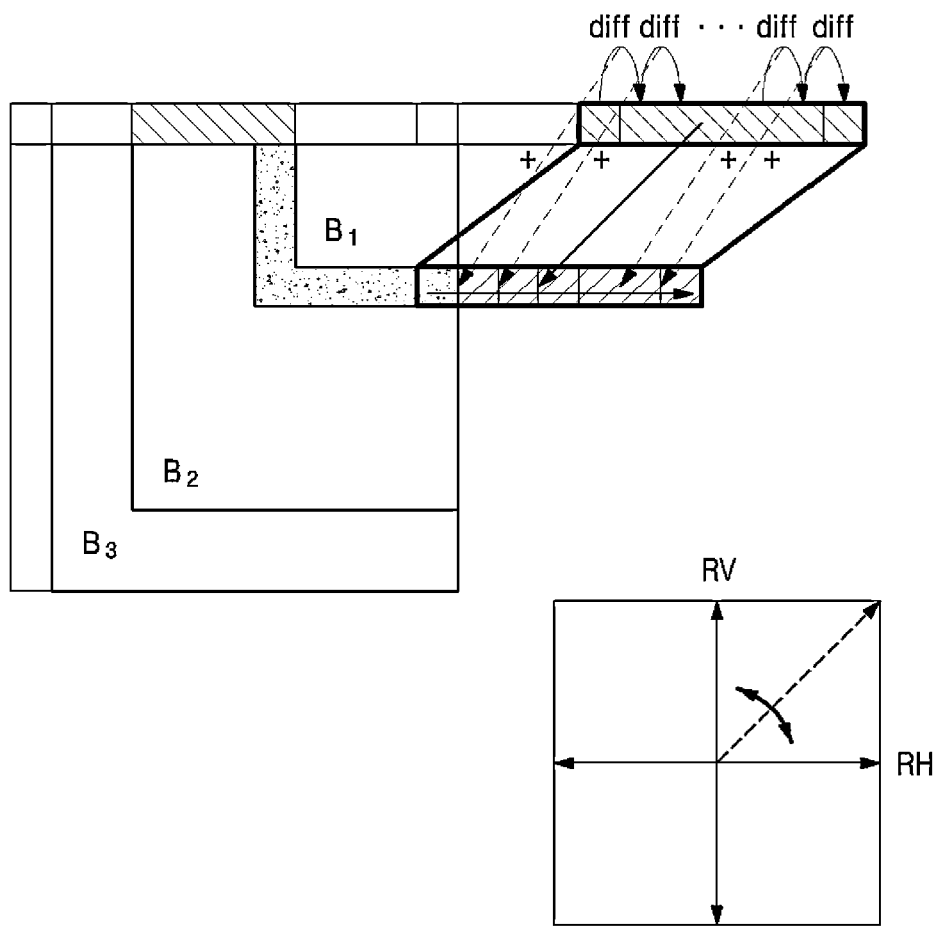

As another embodiment, as in the example of FIG. 16, it is assumed that the block having the size of W×H is split into three blocks according to the SPLIT_RT2LD splitting structure and each block is a current block or a subblock. In addition, the prediction order is $B_1 \rightarrow B_2 \rightarrow B_3$, and after reconstruction of the block $B_1$, the block $B_2$ is predicted according to the directional prediction mode of the intra prediction mode. At this time, the reference sample generator 1002 may generate a reference sample necessary for prediction of the block $B_2$ from the reconstructed signals. In other words, a reference sample may be generated for intra prediction of the block $B_2$ according to the directional prediction mode between the RV direction and the RH direction, as shown in the following example.

In order to apply the directional prediction mode to the block $B_2$, the reference sample generator 1002 may generate the necessary neighboring reference samples using the reconstructed samples on the top of the block having the size of W×H or the samples in the reconstructed block $B_1$. At this time, for positions at the right of the block $B_1$ in which the reconstructed reference sample cannot be used, the value of the closest sample may be copied as many times as necessary.

In addition, in the case of wide-angle intra prediction, the reference sample generator 1002 may generate a reference sample located in a 180 degrees reversed direction of the directional prediction direction of the block $B_2$ from the top block of the reconstructed current block. At this time, when the reference sample at the corresponding position cannot be obtained from the reconstructed sample, the value of the closest available sample may be copied.

In addition, the reference sample generator 1002 may compensate the copied sample value as follows. As shown in the example of FIG. 16, the reference sample generator 1002 calculates difference signals between adjacent samples using samples obtained from the top block of block having the size of W×H. Thereafter, the reference sample generator

1002 may compensate the reference samples to be used for prediction of the block $B_2$ by adding the difference signals to copied samples among the reference samples of the block $B_2$.

Figure 17:
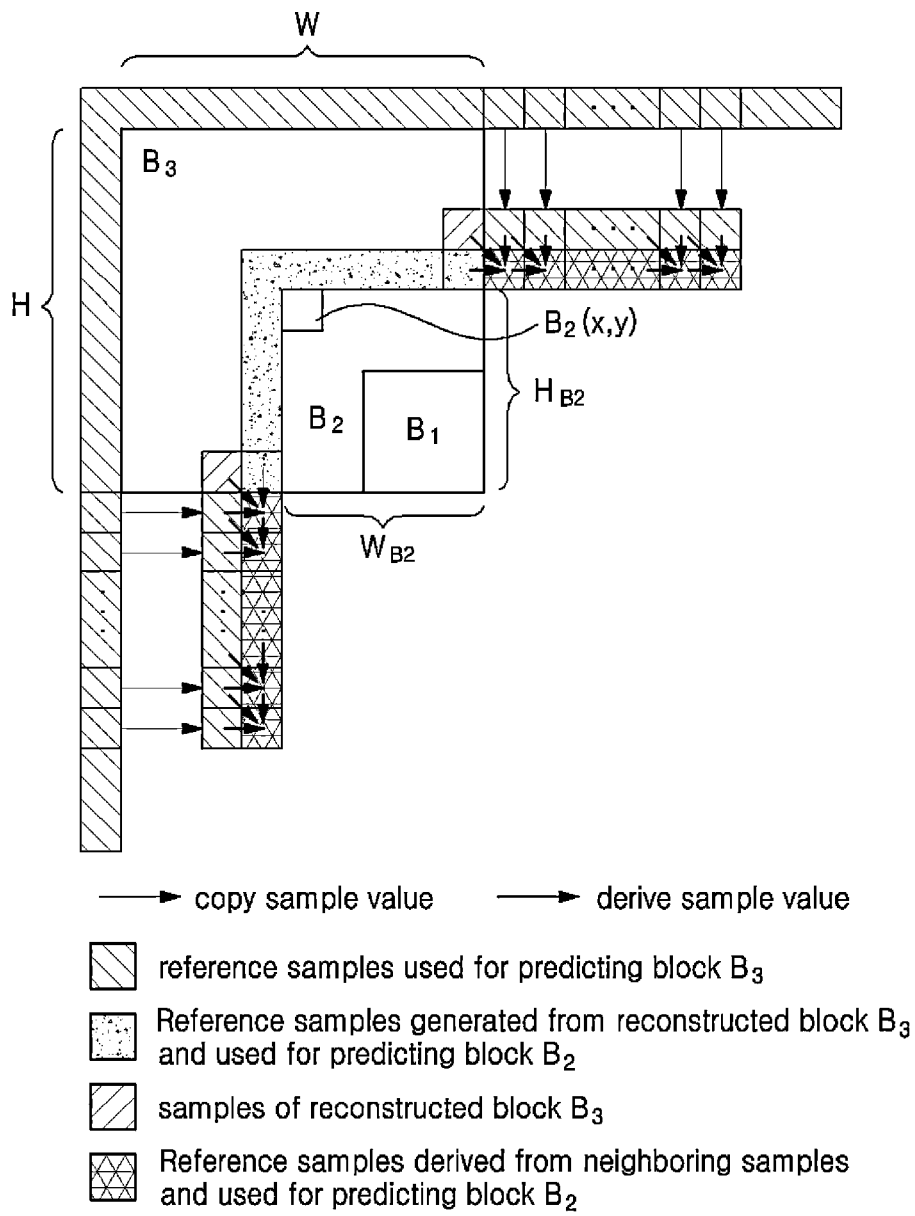
FIGS. 17 and 18 are diagrams illustrating the generation of reference samples, according to another embodiment of the present disclosure.

As another embodiment, as in the example of FIG. 17, it is assumed that the block having the size of W×H is split into three blocks according to the SPLIT_RD2LT splitting structure and each block is a current block or a subblock. In addition, the prediction order is $B_3 \rightarrow B_2 \rightarrow B_1$, and after reconstruction of the block $B_3$, the block $B_2$ is predicted according to the directional prediction mode of the intra prediction mode. At this time, if there are no available samples at neighboring positions for prediction of the block $B_2$, the reference sample generator 1002 may generate reference samples around the block $B_2$, as shown in Equation 1 and Equation 2.

$$0 \le q \le H_{B_2} - 1, B_2(x-1, y + H_{B_2} + q) = \quad \text{[Equation 1]}$$
$$\frac{1}{a+b+c}\{a \times B_2(x-1, y + H_{B_2} - 1 + q) +$$
$$b \times B_2(x-2, y + H_{B_2} - 1 + q) + c \times B_2(x-2, y + H_{B_2} + q)\}$$

$$0 \le p \le W_{B_2} - 1, B_2(x + W_{B_2} + p, y - 1) = \quad \text{[Equation 2]}$$
$$\frac{1}{(a' + b' + c')}\{a' \times B_2(x + W_{B_2} - 1 + p, y - 1) +$$
$$b' \times B_2(x + W_{B_2} - 1 + p, y - 2) + c' \times B_2(x + W_{B_2} + p, y - 2)\}$$

Here, any integers a, b, c, a', b', and c' satisfy a+b+c≠0 and a'+b'+c'≠0. According to Equation 1, each reference sample at the bottom of the block $B_2$ may be calculated as the weighted sum of the reference sample at the top of the corresponding sample, the left reference sample of the block having the size of W×H, and the reference sample of the top left of the block having the size of W×H. In addition, according to Equation 2, each reference sample on the right of the block $B_2$ may be calculated as the weighted sum of the reference sample on the left of the corresponding sample, the top reference sample of the Block having the size of W×H, and the top left reference sample of the block having the size of W×H.

Figure 18:
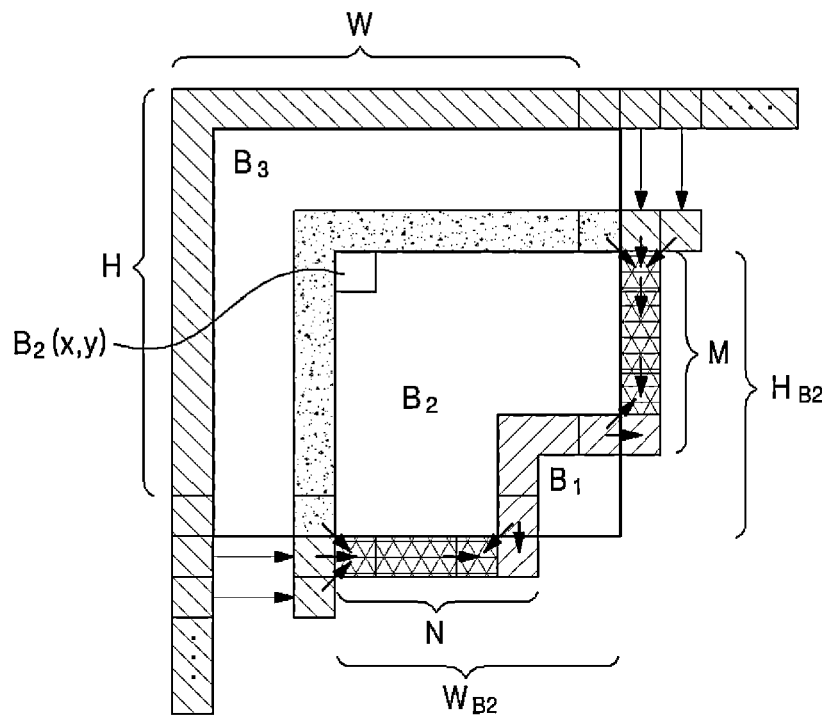

As another embodiment, as in the example of FIG. 18, it is assumed that the block having the size of W×H is split into three blocks according to the SPLIT_LT2RD splitting structure and each block is a current block or a subblock. In addition, the prediction order is $B_3 \rightarrow B_1 \rightarrow B_2$, and after reconstruction of the block $B_3$ and $B_1$, the block $B_2$ is predicted according to the directional prediction mode of the intra prediction mode. At this time, if there are no available samples at neighboring positions for prediction of the block $B_2$, the reference sample generator 1002 may generate reference samples around the block $B_2$, as shown in Equation 3 and Equation 4.

$$B_2(x, y + H_{B_2}) = \quad \text{[Equation 3]}$$
$$\frac{1}{a+b+c}\{a \times B_2(x-1, y + H_{B_2}) + b \times B_2(x-1, y + H_{B_2} - 1) +$$
$$c \times B_2(x-1, y + H_{B_2} + 1)\}B_2(x+p, y + H_{B_2}) =$$
$$B_2(x + p - 1, y + H_{B_2})B_2(x + N - 1, y + H_{B_2}) = \frac{1}{d+e}$$

$$\{d \times B_2(x + N - 2, y + H_{B_2}) + e \times B_2(x + N, y + H_{B_2} - 1)\}$$

$$B_2(x, y + H_{B_2}) = \quad \text{[Equation 4]}$$
$$\frac{1}{a+b+c}\{a \times B_2(x-1, y + H_{B_2}) + b \times B_2(x-1, y + H_{B_2} - 1) +$$
$$c \times B_2(x-1, y + H_{B_2} + 1)\}B_2(x+p, y + H_{B_2}) =$$
$$B_2(x + p - 1, y + H_{B_2})B_2(x + N - 1, y + H_{B_2}) = \frac{1}{d+e}$$
$$\{d \times B_2(x + N - 2, y + H_{B_2}) + e \times B_2(x + N, y + H_{B_2} - 1)\}$$

Here, p satisfies 1≤p≤N−1, and q satisfies 1≤q≤M−1. In addition, any integer a to e and a' to e' satisfy a+b+c≠0, d+e≠0, a'+b'+c'≠0, and d'+e'≠0. According to Equation 3, a first reference sample at the bottom of the block $B_2$ may be calculated as the weighted sum of the reference sample at the top left of the corresponding sample and the left reference samples of the block having the size of W×H. A p(2≤p≤N−2)-th reference sample at the bottom of the block $B_2$ may copy the reference sample to the left of the corresponding sample. The N−−1-th reference sample at the bottom of the block $B_2$ may be calculated as the weighted sum of the reference sample on the left of the corresponding sample and the reference sample at the top right of the corresponding sample.

In addition, according to Equation 4, a first reference sample on the right of the block $B_2$ may be calculated as the weighted sum of the reference sample at the top left of the corresponding sample and the top reference samples of the block having the size of W×H. The q(2≤q≤M−2)-th reference sample at the right of the block $B_2$ may copy the reference sample at the top of the corresponding sample. The M−1-th reference sample at the right of the block $B_2$ may be calculated as the weighted sum of the reference sample at the top of the corresponding sample and the reference sample at the bottom left of the corresponding sample.

Figure 19A:
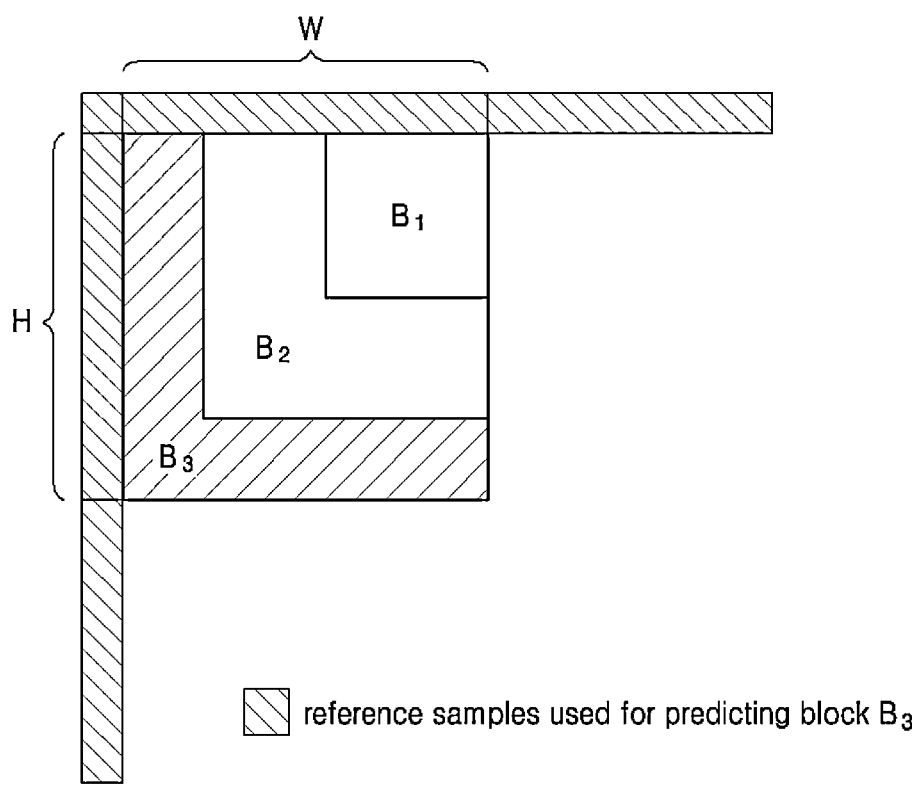
FIGS. 19A-22B are diagrams illustrating the generation of reference samples, according to another embodiment of the present disclosure.
Figure 19B:
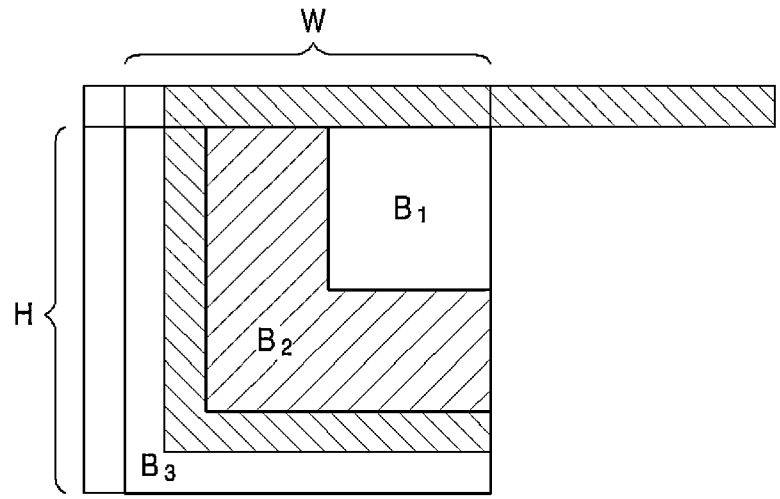
Figure 19B:
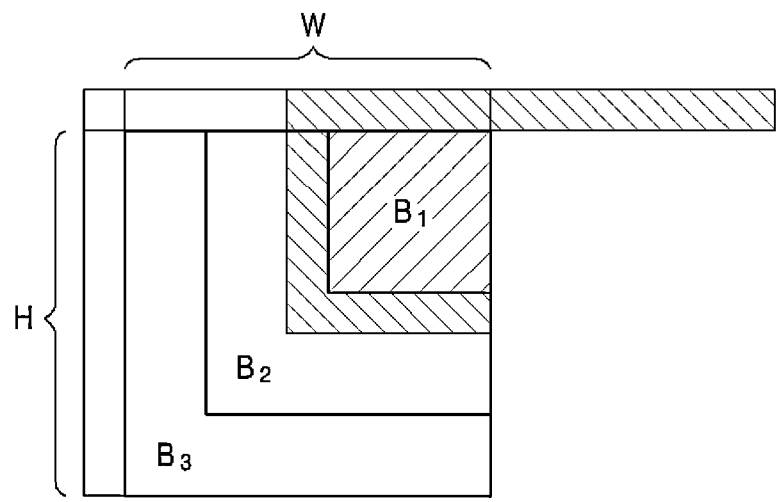

Meanwhile, as an embodiment, it is assumed that the block having the size of W×H is split into three blocks according to the SPLIT_RT2LD splitting structure and each block is a current block or a subblock. In addition, when the prediction order is $B_3 \rightarrow B_2 \rightarrow B_1$, the positions of reference samples used for prediction of each block may be configured as shown in the examples of FIGS. 19A and 19B. In other words, in the case of the block $B_3$, reference samples may be generated at the top and left of the block $B_3$. In the case of block $B_2$, reference samples may be generated at the top, left, and bottom of the block $B_2$. In the case of block $B_1$, reference samples may be generated at the top, left, and bottom of the block $B_1$.

Figure 20A:
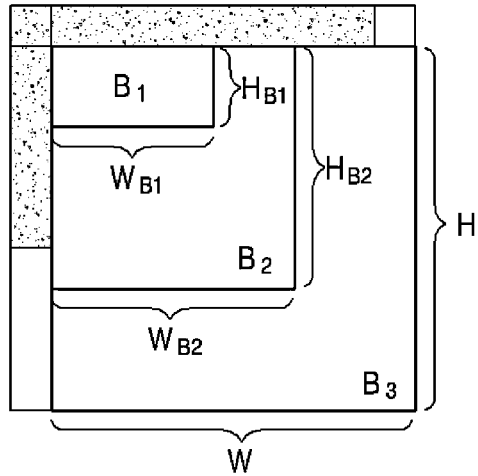
Figure 20A:
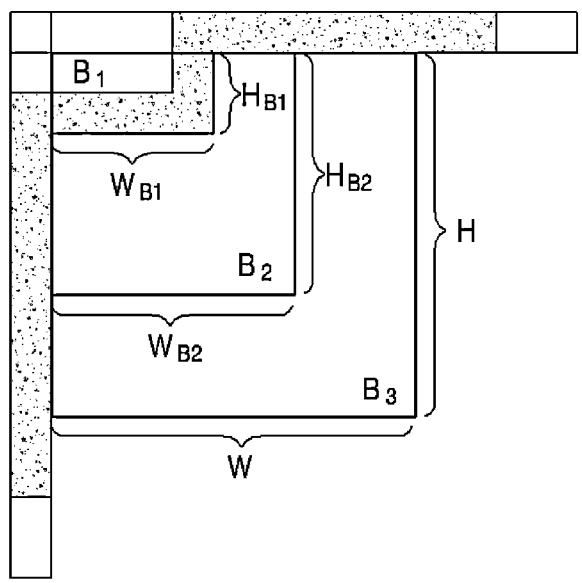
Figure 20B:
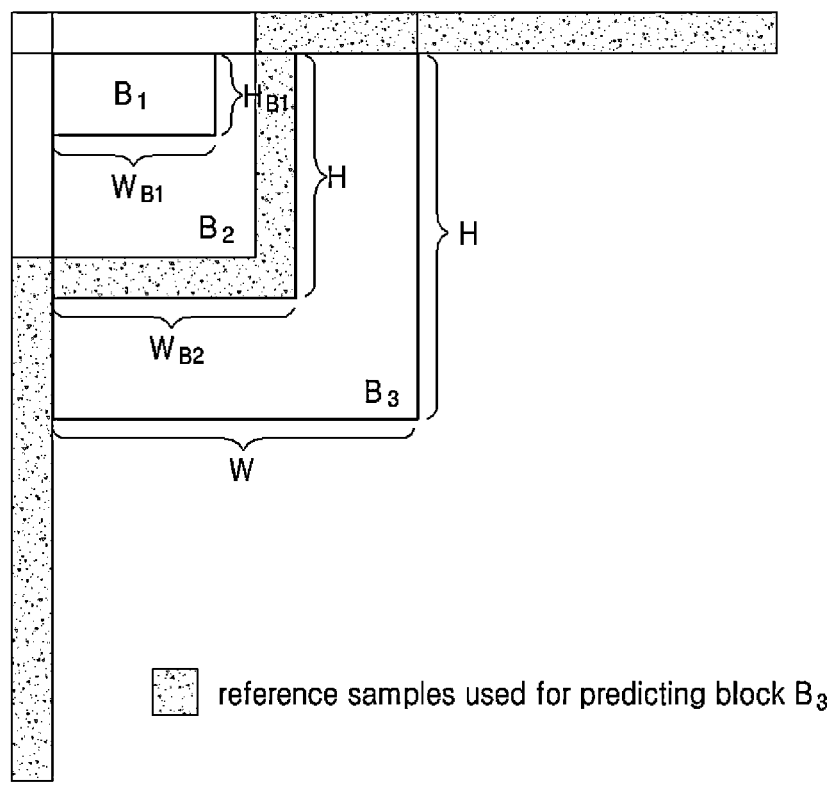

As another example, it is assumed that the block having the size of W×H is split into three blocks according to the SPLIT_LT2RD splitting structure and each block is a current block or a subblock. In addition, when the prediction order is $B_1 \rightarrow B_2 \rightarrow B_3$, the positions of reference samples used for prediction of each block may be configured as shown in the examples of FIGS. 20A and 20B. In other words, in the case of the block $B_1$, reference samples may be generated at the top and left of the block $B_1$. In the case of the block $B_2$, reference samples may be generated on the top and left of the block $B_2$. In the case of the block $B_3$, reference samples may be generated at the top and left of the block $B_3$.

Figure 21A:
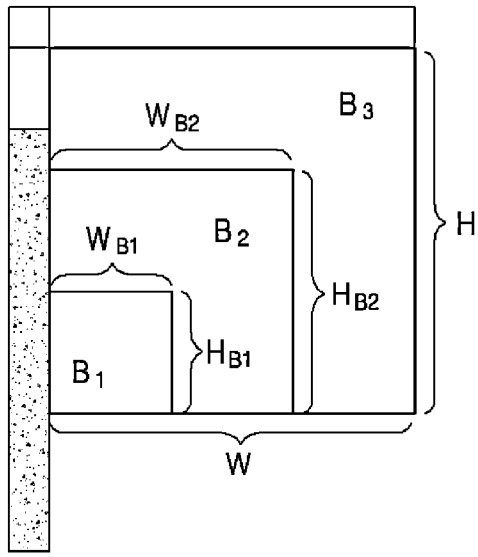
Figure 21A:
Figure 21A:
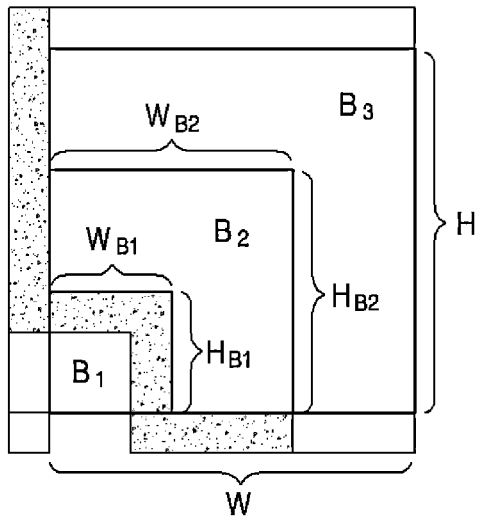
Figure 21A:
Figure 21B:
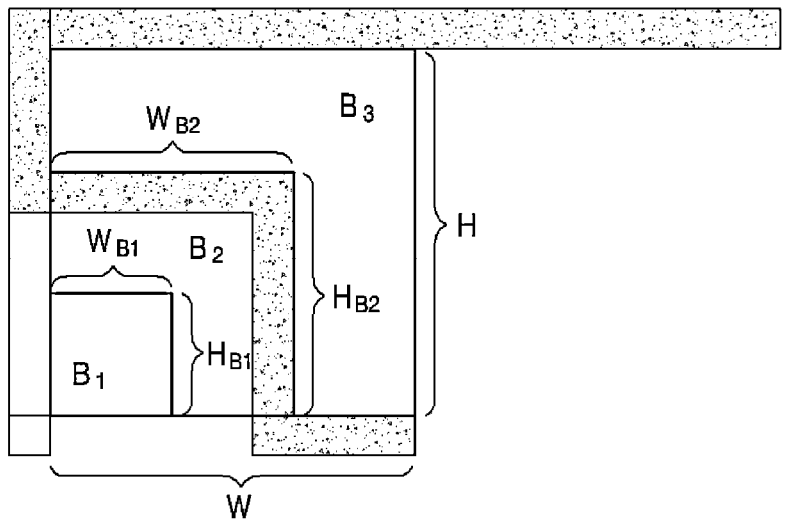

As another example, it is assumed that the block having the size of W×H is split into three blocks according to the SPLIT_LD2RT splitting structure and each block is a current block or a subblock. In addition, when the prediction order is $B_1 \rightarrow B_2 \rightarrow B_3$, the positions of reference samples used for prediction of each block may be configured as shown in the examples of FIGS. 21A and 21B. In other words, in the case of the block $B_1$, reference samples may be generated on the left of the block $B_1$. In the case of the block $B_2$, reference samples may be generated at the bottom and left of the block $B_2$. In the case of block $B_3$, reference samples may be generated at the top, left, and bottom of the block $B_3$.

Figure 22A:
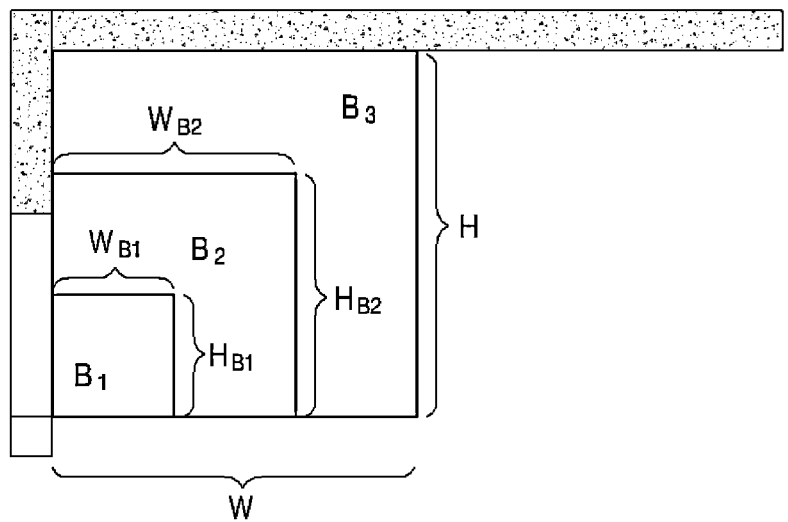
Figure 22B:
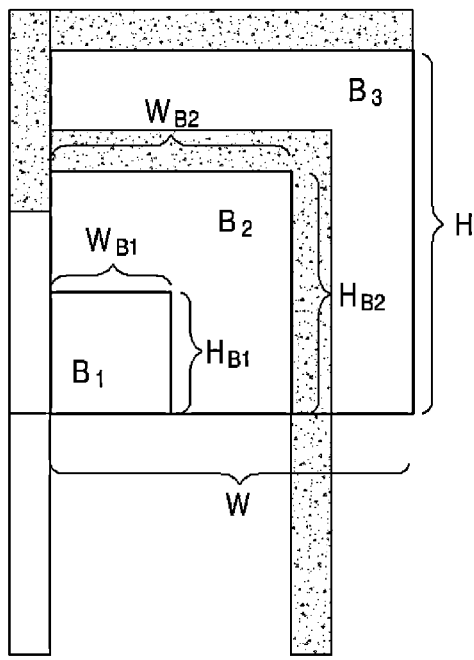
Figure 22B:
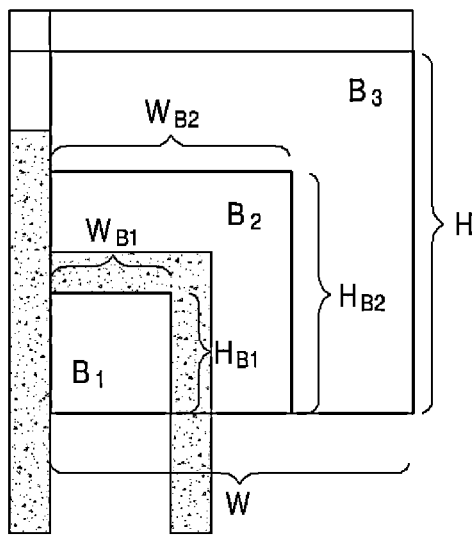

As another example, it is assumed that the block having the size of W×H is split into three blocks according to the SPLIT_LD2RT splitting structure and each block is a current block or a subblock. In addition, when the prediction order is $B_3 \rightarrow B_2 \rightarrow B_1$, the positions of reference samples used for prediction of each block may be configured as shown in the examples of FIGS. 22A and 22B. In other words, in the case of the block $B_3$, reference samples may be generated at the top and left of the block $B_3$. In the case of block $B_2$, reference samples may be generated on the top, left, and right of the block $B_2$. In the case of block $B_1$, reference samples may be generated on the top, left, and right of the block $B_1$.

Hereinafter, examples in which the prediction value corrector 1004 corrects prediction samples using reference samples after the prediction samples of the current block are generated according to the intra prediction mode are described. Here, the current block may be one of the prediction units obtained by splitting the upper block having the size of W×H according to the methods illustrated in FIG. 8. Alternatively, the current block is a block having the size of W×H and may be split into subblocks according to the methods illustrated in FIG. 8.

Figure 23A:
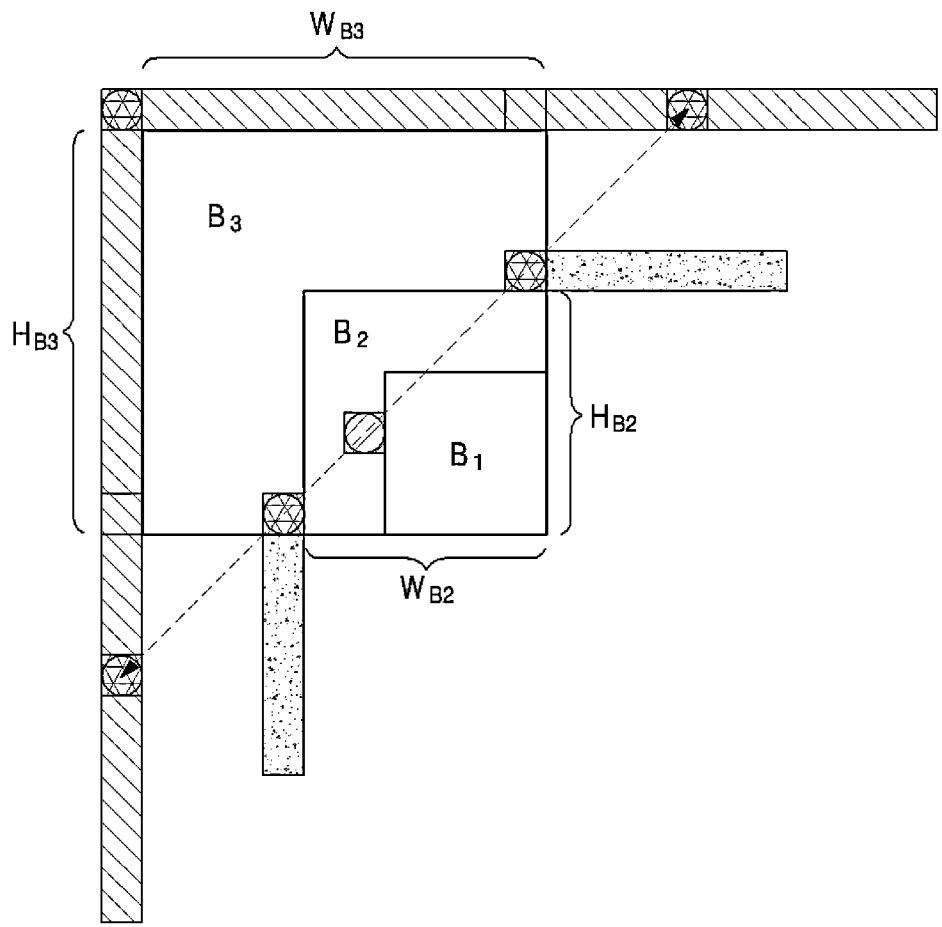
FIGS. 23A-23C are diagrams illustrating correction of predicted samples, according to an embodiment of the present disclosure.
Figure 23B:
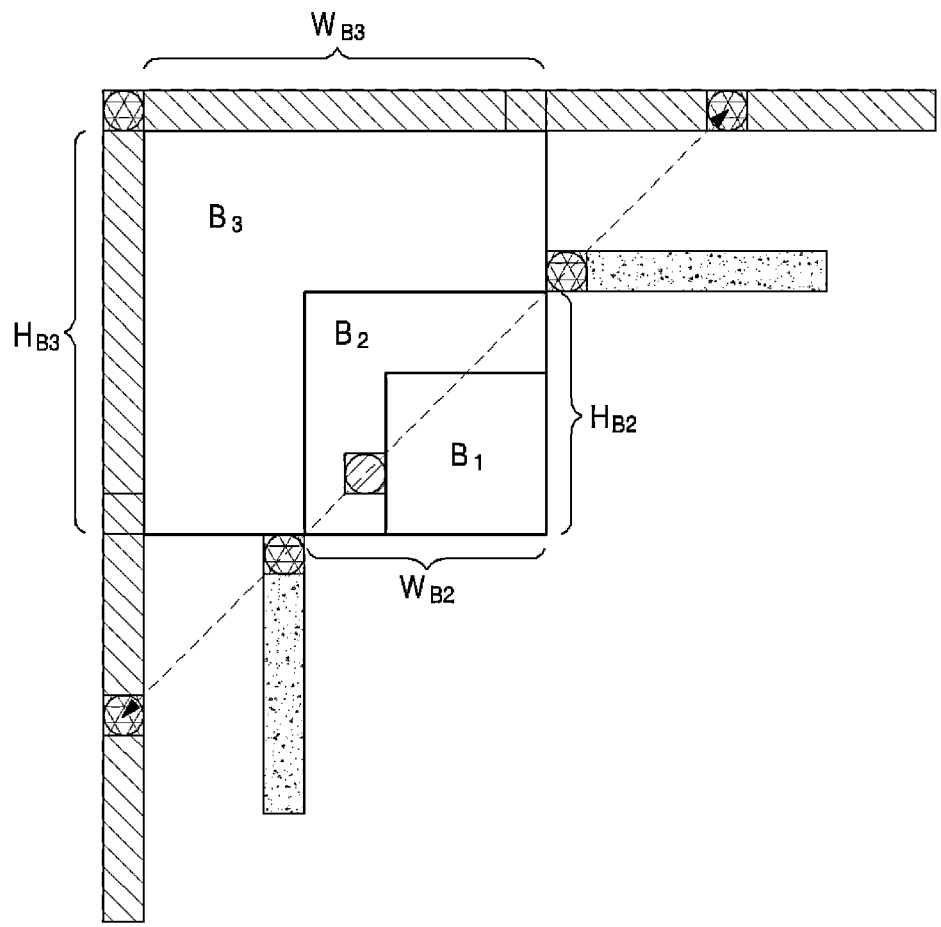
Figure 23C:
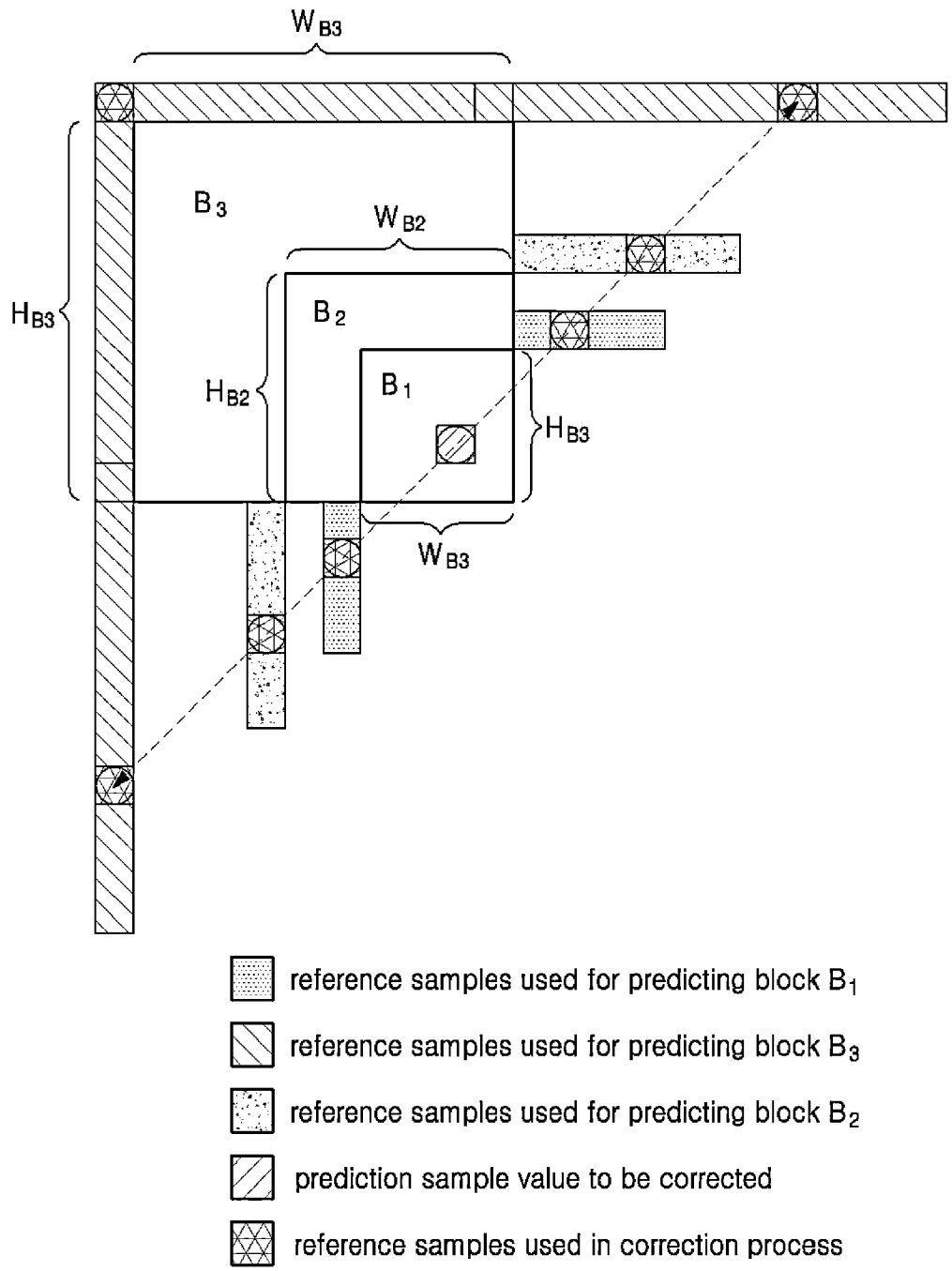

As an example, it is assumed that the block having the size of W×H is split into three blocks according to the SPLIT_RD2LT splitting structure and each block is a current block or a subblock. After each block is predicted, as shown in the examples of FIGS. 23A-23C, the prediction value corrector 1004 may correct the prediction samples using reference samples.

To illustrate the number of reference samples used for correction, it is assumed that the block is split into K blocks according to the nonrectangular block splitting methods illustrated in FIG. 8. If the sample of the current position is included in the block $B_N$ for N where $1 \leq N \leq K$, the prediction value corrector 1004 may use 3+2(K−N) reference samples to perform prediction sample value correction based on linear interpolation.

According to embodiments, as reference samples to be used in performing sample value correction, the predicted value corrector 1004 may use samples existing in the reconstructed available rows and columns closest to the current block.

Figure 24A:
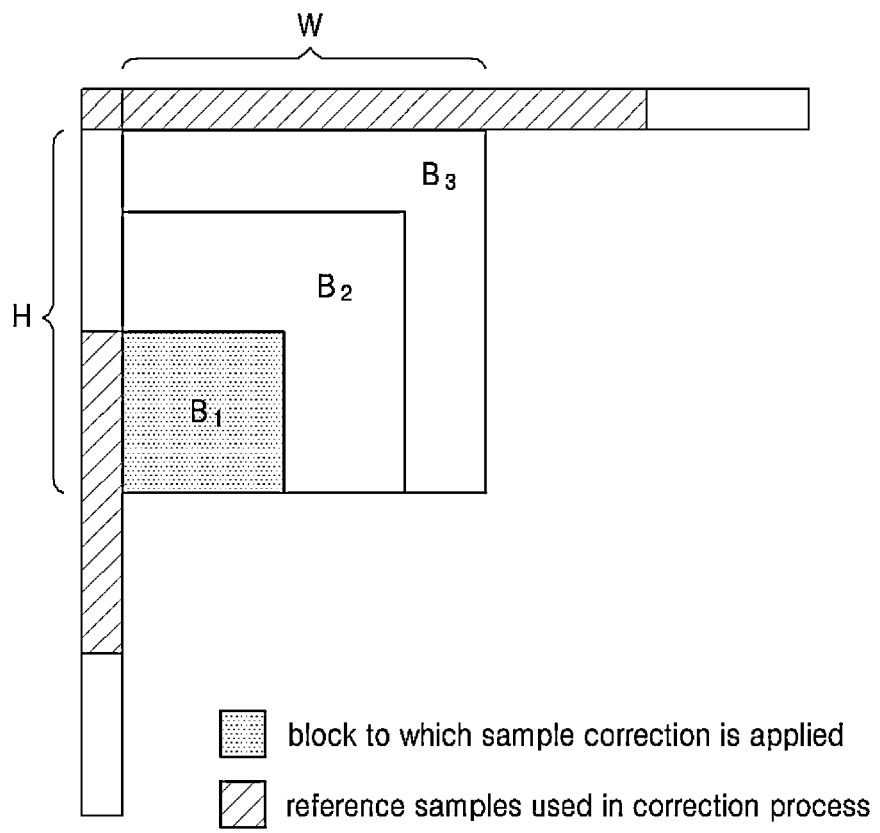
FIGS. 24A-24C are diagrams illustrating samples used for correction of predicted samples, according to an embodiment of the present disclosure.
Figure 24B:
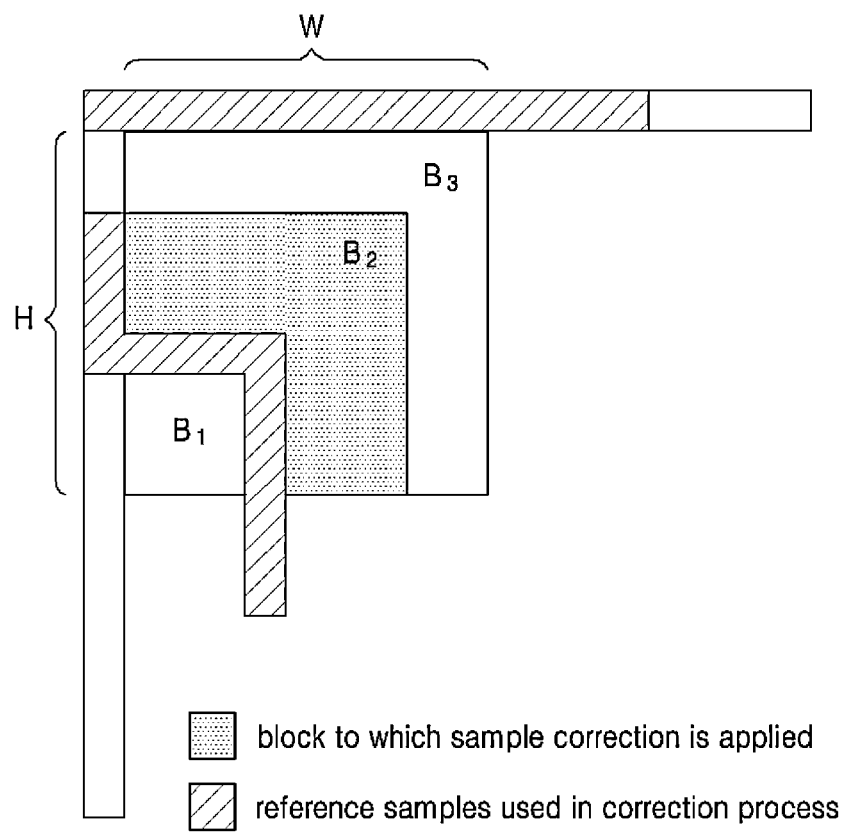
Figure 24C:
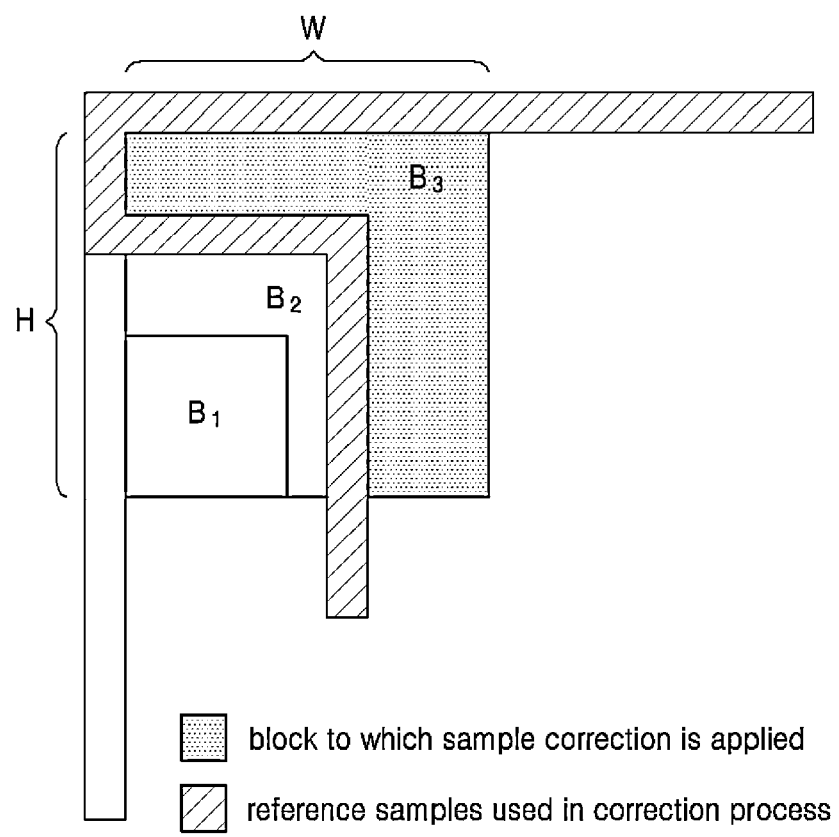

For example, it is assumed that the block having the size of W×H is split into 3 blocks according to the SPLIT_LD2RT splitting structure and each block is a current block or a subblock. In addition, each block is predicted in order of $B_1 \rightarrow B_2 \rightarrow B_3$. To correct prediction samples, the prediction value corrector 1004 may use adjacent reference samples for each block, as shown in the examples of FIGS. 24A-24C.

Hereinafter, the operation of the transform unit determiner 712 in the inverse transformer 530 is described.

The transform unit determiner 712 may determine the transform unit by parsing the splitting information. For a nonrectangular block according to the present embodiment, the transform unit determiner 712 may determine the transform unit as shown in the examples of FIGS. 25A-25D according to the transform unit splitting method.

As an example, in the case of transform unit configuration 1, the inverse transform order and transform order may be a Z-scan order, an inverse Z-scan order, or an order agreed between the video encoding apparatus and the video decoding apparatus.

As another example, in the case of including multiple transform units, prediction of a subsequent region may be performed by referring to samples in the block on which inverse transform and reconstruction were first performed. At this time, after the blocks in the previous order are sequentially reconstructed, inverse transform and reconstruction of the blocks in the next order may be performed.

Figure 25A:
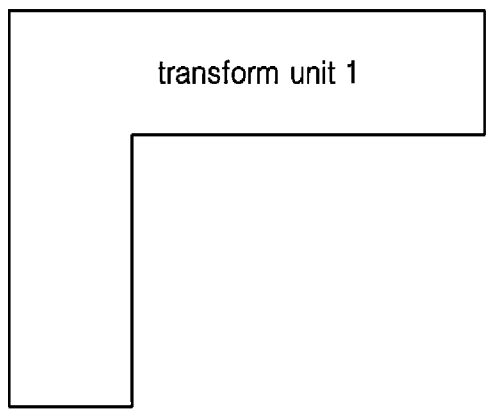
FIGS. 25A-25D are diagrams illustrating a transform unit splitting method, according to an embodiment of the present disclosure.
Figure 25A:
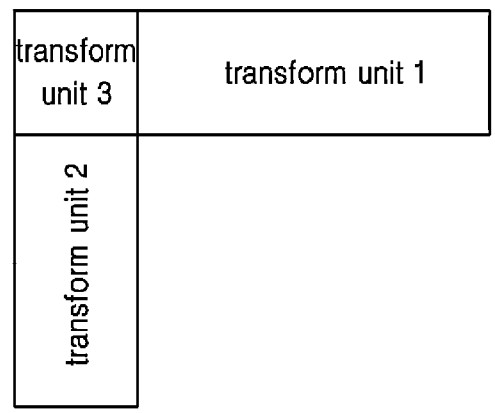
Figure 25A:
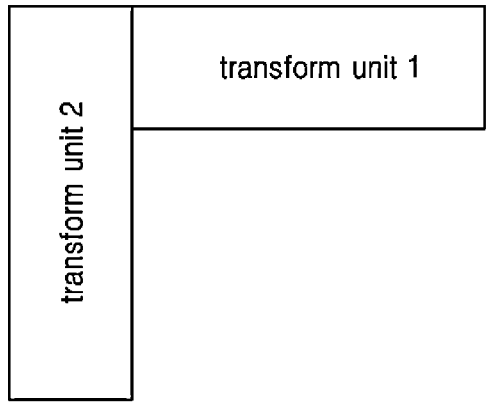
Figure 25A:
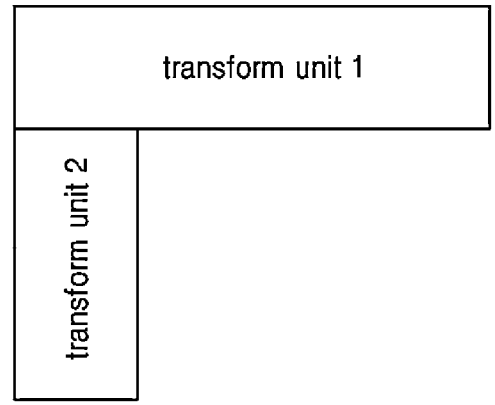
Figure 25B:
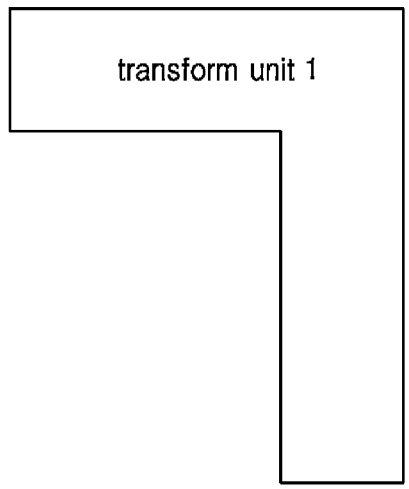
Figure 25B:
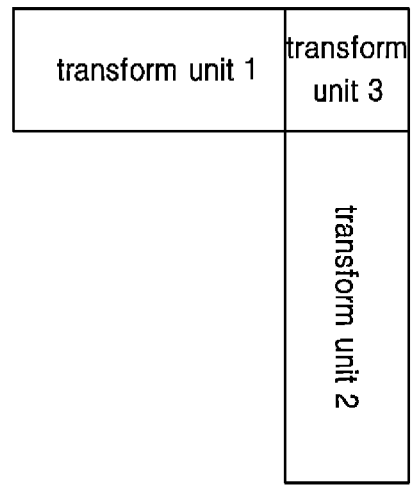
Figure 25B:
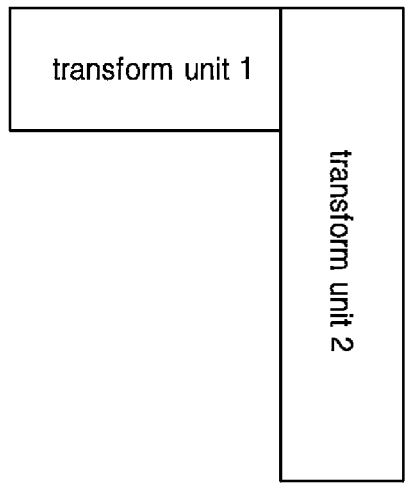
Figure 25B:
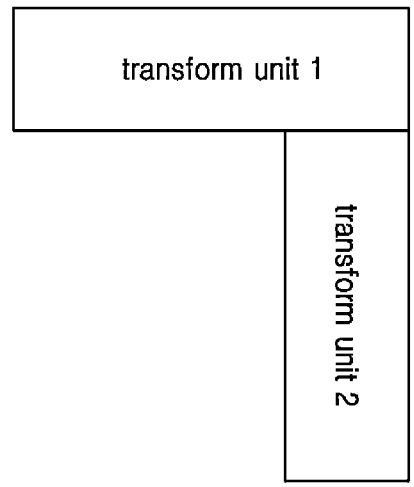
Figure 25C:
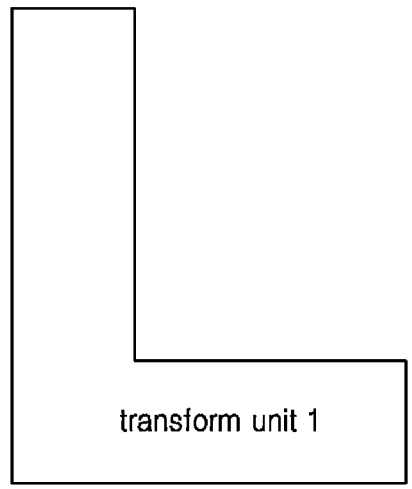
Figure 25C:
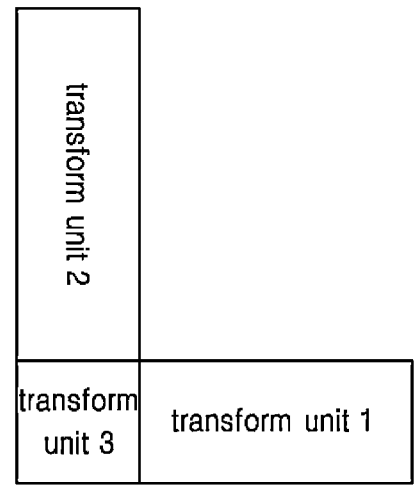
Figure 25C:
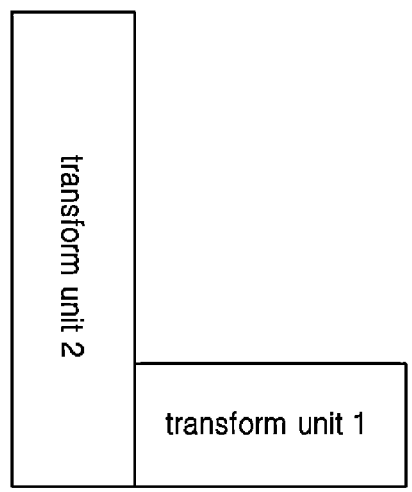
Figure 25C:
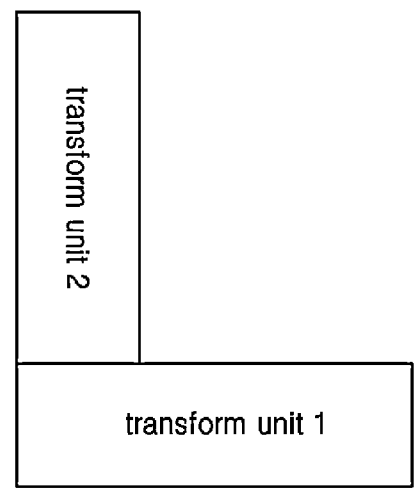
Figure 25D:
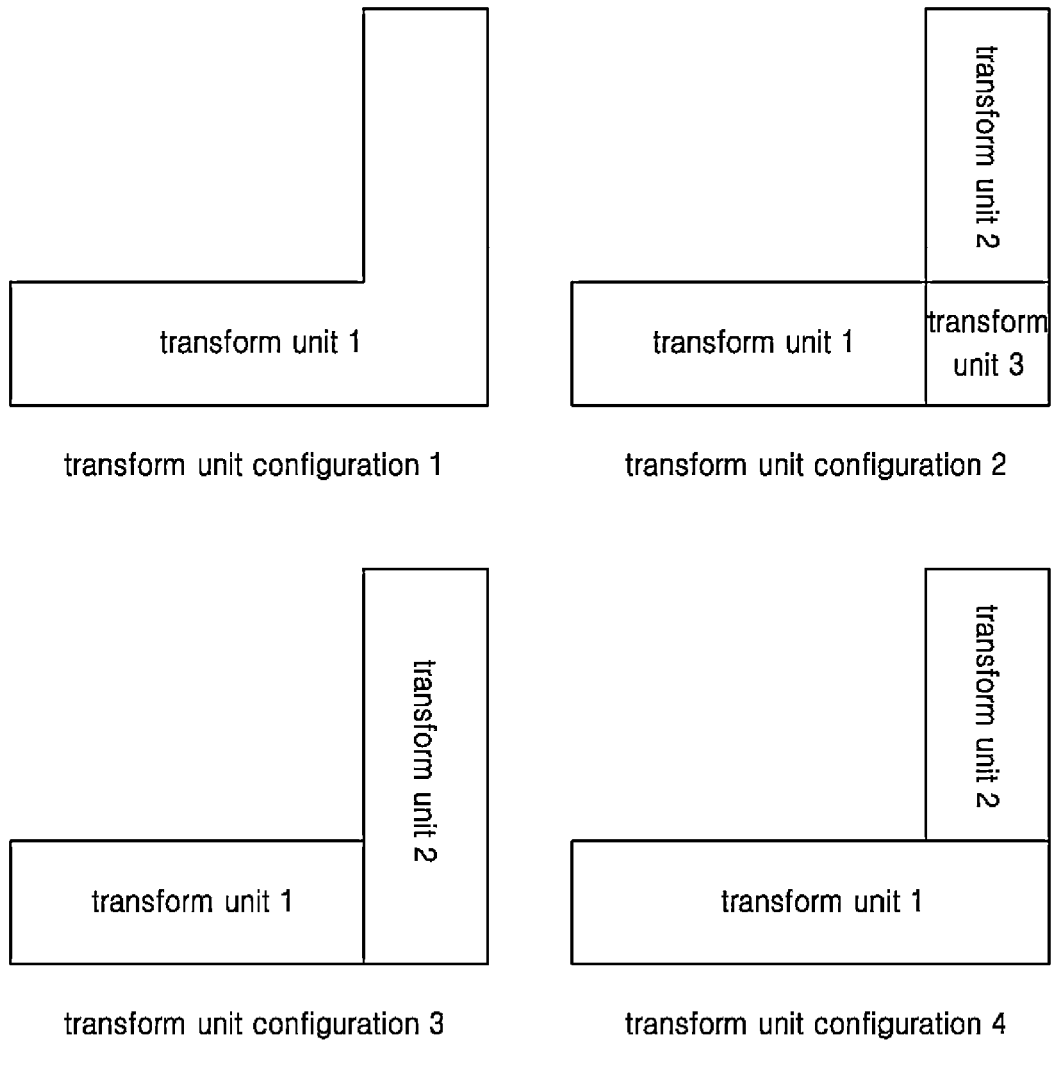
Figure 26:
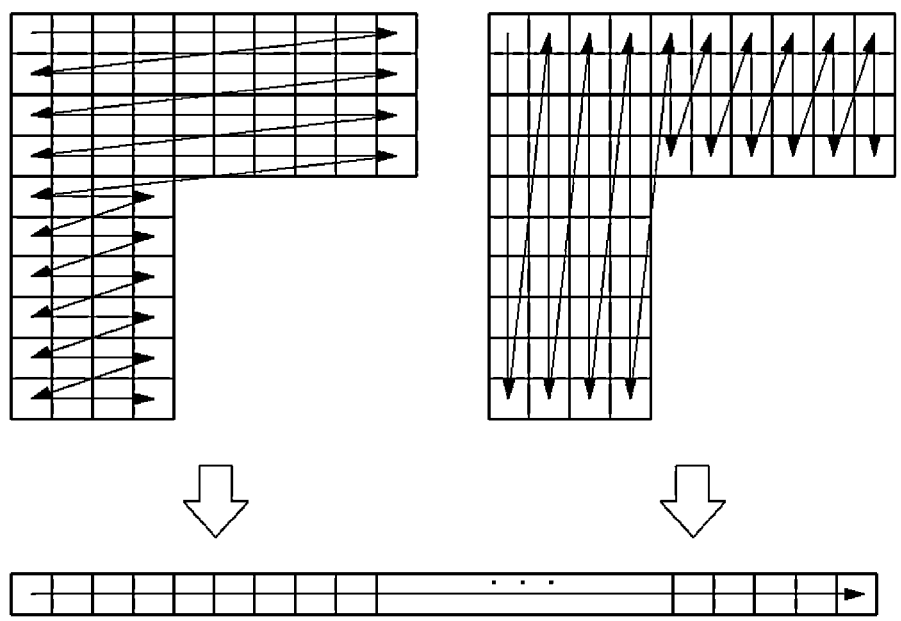
FIG. 26 is a diagram illustrating a scanning method, according to an embodiment of the present disclosure.

As an example, when the current block is split with the SPLIT_RD2LT splitting structure and the nonrectangular partition block is determined to be a transform unit, such as transform unit configuration 1 in the example of FIG. 25A, the nonrectangular block may be converted into 1D form using the scan method as shown in FIG. 26. Thereafter, 1D transform and inverse transform may be performed on the 1D block.

Figure 27:
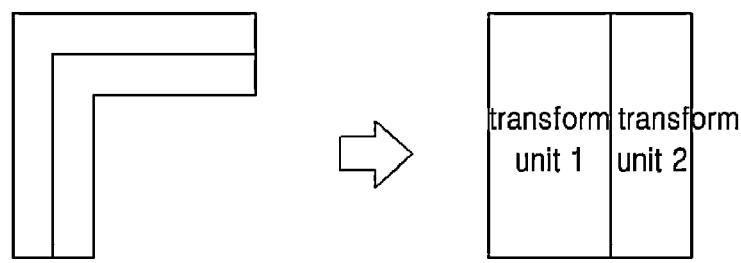
FIG. 27 is a diagram illustrating nonrectangular transform units, according to an embodiment of the present disclosure.
Figure 27:
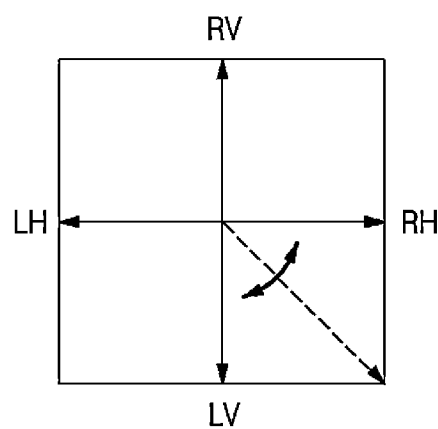

As another example, when the current block is split into a nonrectangular block splitting structure and the nonrectangular split block is predicted according to the directional prediction mode of intra prediction, the transform unit of the nonrectangular split block may be configured according to the directionality of the prediction mode. For example, it is assumed that the current block is split according to the SPLIT_RD2LT splitting structure, and directional prediction mode between the RH direction and LV direction is performed on the nonrectangular block. At this time, as in the example of FIG. 27, after splitting the nonrectangular block into nonrectangular units, a plurality of nonrectangular transform units is configured as rectangular transform units using a scanning method, such as Z-scan order or inverse Z-scan order, and transforms may be performed on multiple rectangular transform units.

Meanwhile, if the height and/or width of each transform unit is not the n power of 2, 'non-power of 2' transform may be applied.

As another example, if the height and/or width of each transform unit is not the n power of 2, the non-n power of 2 portion of the height and/or width of each transform unit may be further split to determine the transform unit so that the height and the width of each transform unit is the n power of 2.

As an embodiment, the same transform unit configuration method may be applied to prediction blocks having a nonrectangular shape among prediction blocks split according to the nonrectangular splitting method, or a different transform unit configuration method may be used for each prediction block.

As another embodiment, the transform unit may be implicitly determined by an agreement between the video encoding apparatus and the video decoding apparatus according to the splitting structure for configuring the prediction unit.

Figure 28:
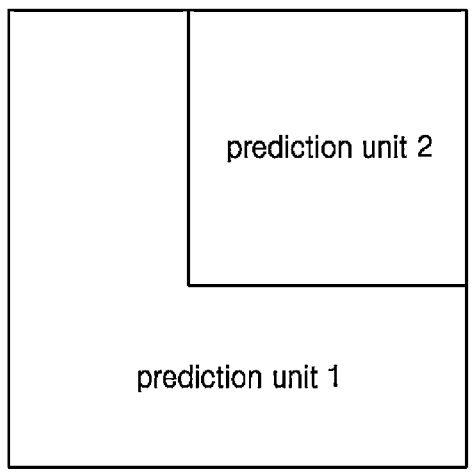
FIG. 28 is a diagram illustrating prediction units, according to an embodiment of the present disclosure.

As an example, it is assumed that, for the current block having the size of W×H, prediction unit 1 and prediction unit 2 are determined according to the SPLIT_RT2LD splitting structure as in the example of FIG. 28 and the prediction order is 'prediction unit 1→prediction unit 2'. When prediction unit 2 is predicted according to the inter prediction or IBC prediction mode, after prediction of prediction unit 1 and prediction unit 2, transform and inverse transform of the entire W×H block may be performed. At this time, prediction unit 1 may be predicted without referring to the region of prediction unit 2.

When a transform unit is determined and transform and inverse transform are performed, previously reconstructed values may be used as reference samples when predicting the next transform unit depending on the scan order. At this time, after inverse transform and reconstruction are performed on the blocks in the previous order, prediction, inverse transform, and reconstruction may be performed on the blocks in the next order.

Meanwhile, when the block having the size of W×H is split into K blocks according to the nonrectangular block splitting methods illustrated in FIG. 8 and each block is a current block or a subblock, a filtering process may be performed to compensate for discontinuity between block boundaries that may occur during the prediction and reconstruction process of the block unit after the current block is reconstructed.

As an example, filtering may be performed not in units of n×m, but on a per prediction unit or subblock split by the method illustrated in FIG. 8.

Alternatively, the calculation of the length of inter-block filtering and the strength of discontinuity may be performed on a per block split by the method illustrated in FIG. 8.

Alternatively, classification of the characteristics of the block on which filtering is to be performed may be performed on a per block split by the method illustrated in FIG. 8, and filtering may also be performed on a per corresponding blocks.

Hereinafter, a video encoding method and a video decoding method of performing intra prediction using nonrectangular block splitting are described using the examples of FIGS. 29-31.

Figure 29:
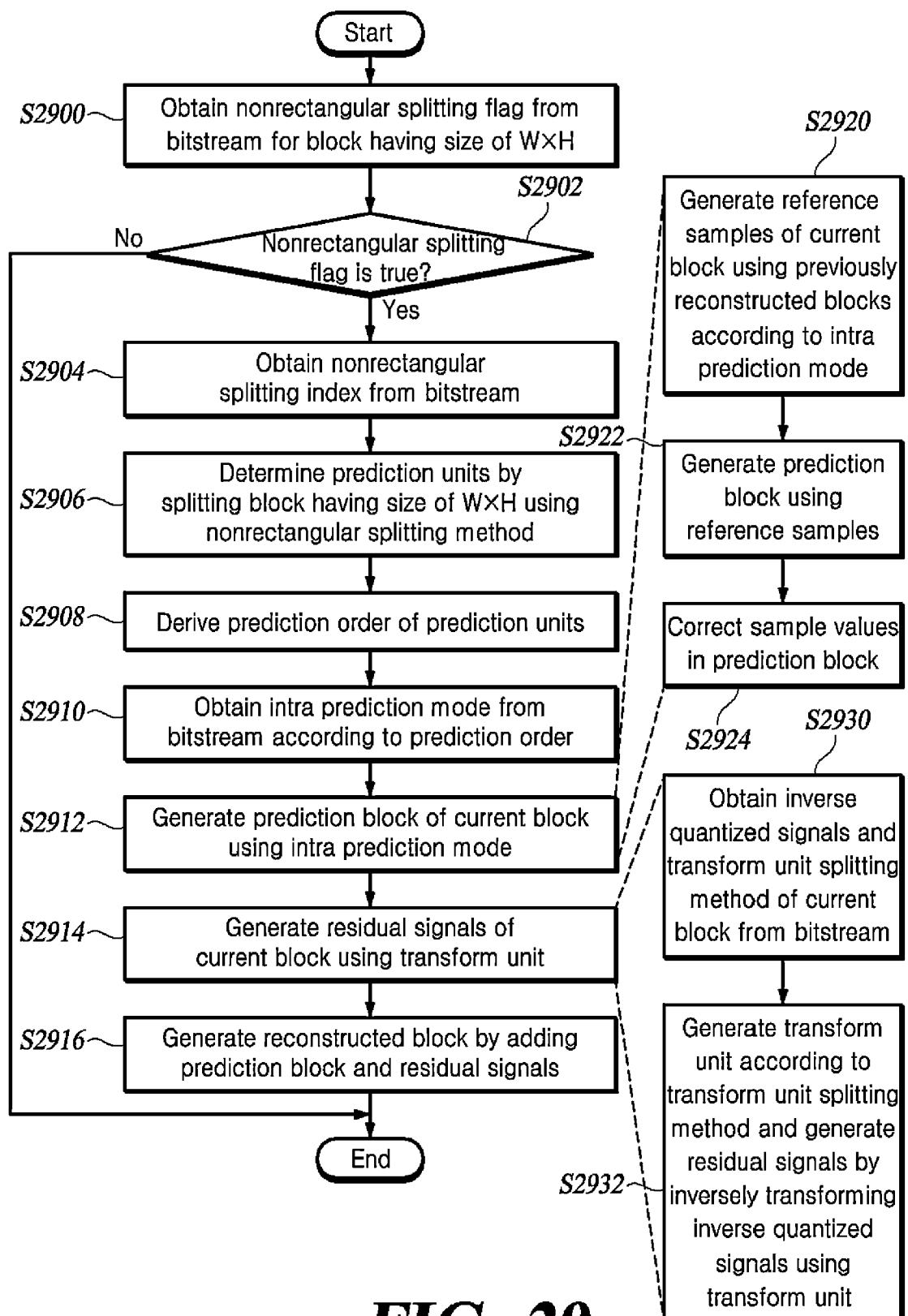
FIG. 29 is a flowchart illustrating a video decoding method using nonrectangular block splitting, according to an embodiment of the present disclosure.

FIG. 29 is a flowchart illustrating a video decoding method using nonrectangular block splitting, according to an embodiment of the present disclosure.

The video decoding apparatus obtains a nonrectangular splitting flag from a bitstream for a block having the size of W×H (S2900). Here, W is a width of the block, and H is a height of the block. The nonrectangular splitting flag indicates nonrectangular block splitting for the block.

The video decoding apparatus checks the nonrectangular splitting flag (S2902).

If the nonrectangular splitting flag is true (Yes in S2902), the video decoding apparatus performs the following operations.

The video decoding apparatus obtains a nonrectangular splitting index from the bitstream (S2904). Here, the nonrectangular splitting index indicates one of the nonrectangular splitting methods as illustrated in FIG. 8.

The video decoding apparatus determines prediction units by splitting the block having the size of W×H using a nonrectangular splitting method indicated by the nonrectangular splitting index (S2906). The video decoding apparatus may generate blocks $B_1, B_2, \ldots, B_K$ (here, K is a natural number of 2 or greater) as prediction units using one of the nonrectangular block splitting structures of SPLIT_RD2LT, SPLIT_LD2RT, SPLIT_RT2LD, and SPLIT_LT2RD as illustrated in FIG. 8.

Meanwhile, in the nonrectangular splitting methods illustrated in FIG. 8, K is an agreed value according to W and H and may be, for example, a common divisor of W and H.

The video decoding apparatus derives the prediction order of prediction units (S2908).

The video decoding apparatus derives a fixed prediction order in ascending or descending order according to the nonrectangular splitting method. Here, the ascending order indicates the prediction order of $B_1 \rightarrow B_2 \rightarrow \ldots \rightarrow B_K$, and the descending order indicates the prediction order of $B_K \rightarrow B_{K-1} \rightarrow \ldots \rightarrow B_1$.

As another example, the prediction order may be a random order rather than a fixed order according to the splitting structure. The video decoding apparatus may receive signaled block indices according to the prediction order and then parse the block indices.

The video decoding apparatus obtains an intra prediction mode from the bitstream according to the prediction order for the current block, which is one of the prediction units (S2910).

Meanwhile, available intra prediction modes may be limited depending on the nonrectangular splitting method, the size of the current block, and the aspect ratio of the current block. Alternatively, a flag may be signaled from the video encoding apparatus to limit the intra prediction mode, and the video decoding apparatus may parse the flag to determine the restriction of the prediction mode. Alternatively, the restriction of the prediction mode may be omitted.

The video decoding apparatus generates a prediction block of the current block using the intra prediction mode (S2912).

The operation of generating the prediction block (S2912) includes the following operations.

The video decoding apparatus generates reference samples of the current block using previously reconstructed blocks according to the intra prediction mode (S2920).

The video decoding apparatus may generate reference samples using the reconstructed samples existing in neighboring positions of the current block and the neighboring samples of a block having the size of W×H. If a reference sample does not exist in a neighboring position of the current block, the video decoding apparatus may copy the sample value at the position closest to the corresponding neighboring position as the reference sample, as illustrated in FIGS. 13-16.

As another example, when a reference sample does not exist in a neighboring position of the current block, the video decoding apparatus may generate a reference sample at the corresponding neighboring position by weighting the sample values at the positions closest to the corresponding neighboring position, as illustrated in FIGS. 17 and 18.

The video decoding apparatus generates a prediction block using the reference samples (S2922).

The video decoding apparatus corrects sample values within the prediction block (S2924). The video decoding apparatus may use the samples existing in the reconstructed available rows and columns closest to the current block to correct the samples in the prediction block.

The video decoding apparatus generates residual signals of the current block using the transform unit (S2914).

The operation of generating the residual signals (S2914) includes the following operations.

The video decoding apparatus obtains inverse quantized signals and a transform unit splitting method of the current block from the bitstream (S2930). Here, the transform unit splitting method indicates one of multiple transform unit configurations when the current block is nonrectangular.

The video decoding apparatus generates a transform unit according to the transform unit splitting method, and then, when the current block is nonrectangular, the video decoding apparatus generates the residual signals by inversely transforming the inverse quantized signals using the transform unit (S2932).

The video decoding apparatus generates a reconstructed block by adding the prediction block and residual signals (S2916).

Figure 30:
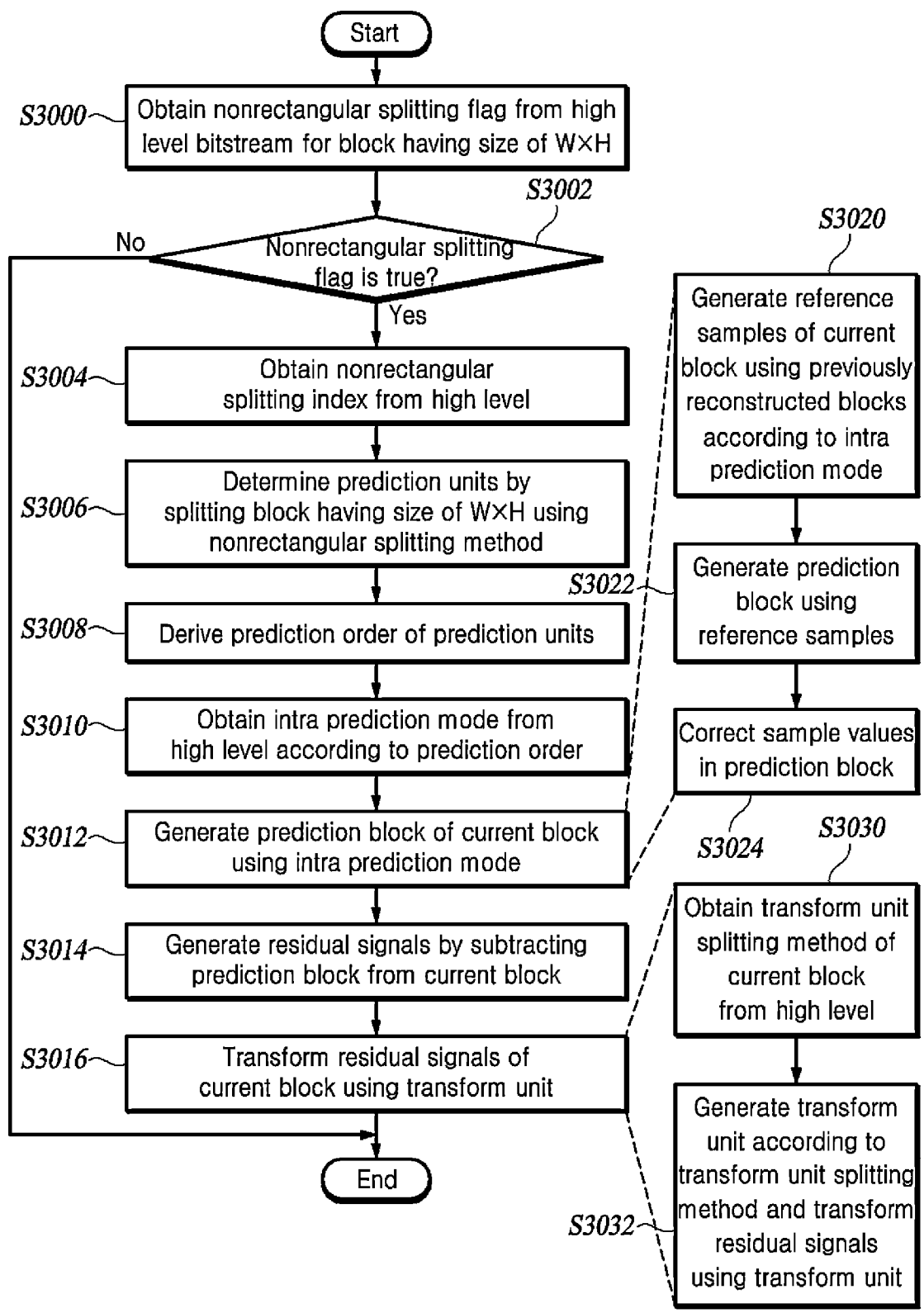
FIG. 30 is a flowchart illustrating a video encoding method using nonrectangular block splitting, according to an embodiment of the present disclosure.

FIG. 30 is a flowchart illustrating a video encoding method using nonrectangular block splitting, according to an embodiment of the present disclosure.

The video encoding apparatus obtains a nonrectangular splitting flag from a high level for a block having the size of W×H (S3000). Here, W is a width of the block, and H is a height of the block. In addition, the nonrectangular splitting flag indicates nonrectangular block splitting for the block.

The video encoding apparatus checks the nonrectangular splitting flag (S3002).

If the nonrectangular splitting flag is true (Yes in S3002), the video encoding apparatus performs the following operations.

The video encoding apparatus obtains a nonrectangular splitting index from the high level (S3004). Here, the nonrectangular splitting index indicates one of the nonrectangular splitting methods.

The video encoding apparatus determines prediction units by splitting the block having the size of W×H using the nonrectangular splitting method indicated by the nonrectangular splitting index (S3006).

The video encoding apparatus derives the prediction order of prediction units (S3008).

The video encoding apparatus obtains an intra prediction mode from the high level according to the prediction order for the current block, which is one of the prediction units (S3010).

The video encoding apparatus generates a prediction block of the current block using the intra prediction mode (S3012).

The operation of generating the prediction block (S3012) includes the following operations.

The video encoding apparatus generates reference samples of the current block using previously reconstructed blocks according to the intra prediction mode (S3020).

The video encoding apparatus generates a prediction block using reference samples (S3022).

The video encoding apparatus corrects sample values within the prediction block (S3024).

The video encoding apparatus generates residual signals by subtracting the prediction block from the current block (S3014).

The video encoding apparatus transforms the residual signals of the current block using a transform unit (S3016).

The operation of transforming the residual signals (S3016) includes the following operations.

The video encoding apparatus obtains a method of splitting the transform unit of the current block from the high level (S3030). Here, the transform unit splitting method indicates one of multiple transform unit configurations when the current block is nonrectangular.

The video encoding apparatus generates a transform unit according to the transform unit splitting method and then, if the current block is nonrectangular, the video encoding apparatus transforms the residual signals using the transform unit (S3032).

Figure 31:
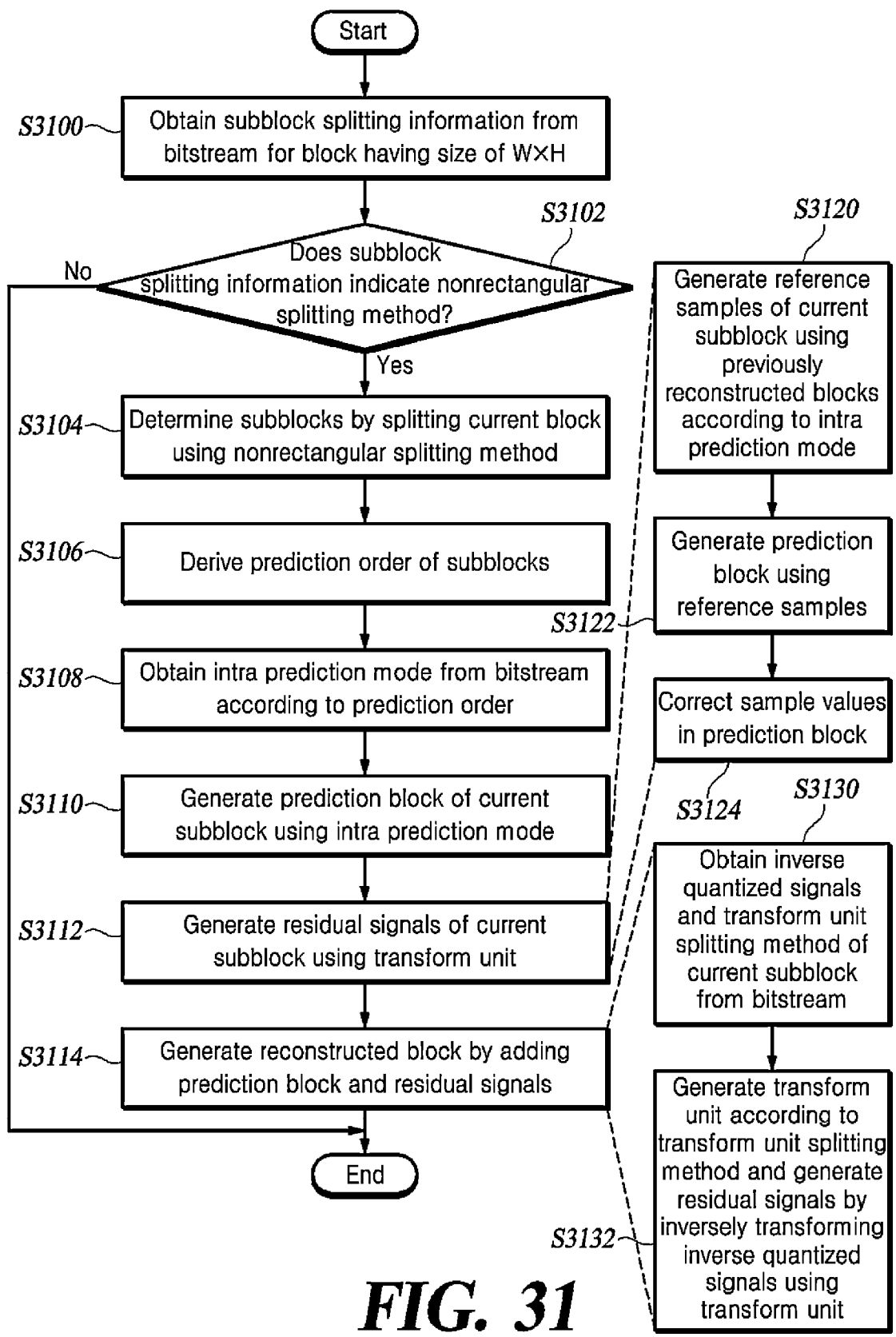
FIG. 31 is a flowchart illustrating a video decoding method using nonrectangular subblock splitting, according to another embodiment of the present disclosure.

FIG. 31 is a flowchart illustrating a video decoding method using nonrectangular subblock splitting, according to another embodiment of the present disclosure.

The video decoding apparatus obtains subblock splitting information from a bitstream for a current block having the size of W×H (S3100). Here, W is a width of the current block, and H is a height of the current block. The subblock splitting information includes whether to split into subblocks and a subblock splitting method, and the subblock splitting method indicates a nonrectangular splitting method, a square splitting method, or a rectangular splitting method.

The video decoding apparatus checks the subblock splitting information (S3102).

When the subblock splitting information indicates performing of subblock splitting and the nonrectangular splitting method (Yes in S3102), the video decoding apparatus performs the following operations.

The video decoding apparatus determines subblocks by splitting the current block using the nonrectangular splitting method (S3104).

The video decoding apparatus derives the prediction order of subblocks (S3106).

The video decoding apparatus obtains an intra prediction mode from the bitstream according to the prediction order for a current subblock, which is one of the subblocks (S3108). At this time, a different prediction mode may be used for each subblock. Alternatively, the same prediction mode may be used for all subblocks. Alternatively, after the prediction mode of the current block is parsed, it may be applied to all subblocks.

The video decoding apparatus generates a prediction block of the current subblock using the intra prediction mode (S3110).

The operation of generating the prediction block (S3110) includes the following operations.

The video decoding apparatus generates reference samples of the current subblock using previously reconstructed blocks according to the intra prediction mode (S3120).

The video decoding apparatus generates a prediction block using reference samples (S3122).

The video decoding apparatus corrects sample values within the prediction block (S3124).

The video decoding apparatus generates residual signals of the current subblock using the transform unit (S3112).

The operation of generating the residual signals (S3112) includes the following operations.

The video decoding apparatus obtains the inverse quantized signals of the current subblock and a transform unit splitting method from the bitstream (S3130). Here, the transform unit splitting method indicates one of multiple transform unit configurations when the current subblock is nonrectangular.

The video decoding apparatus generates a transform unit according to the transform unit splitting method, and then, when the current subblock is nonrectangular, the video decoding apparatus inversely transforms the inverse quantized signals using the transform unit to generate the residual signals (S3132).

The video decoding apparatus generates a reconstructed block by adding the prediction block and residual signals (S3114).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

120: predictor
165: inverse transformer
530: inverse transformer
540: predictor
702: prediction unit determiner
704: prediction technology determiner
706: prediction order determiner
708: prediction mode determiner
710: prediction performer

What is claimed is:

1. A method for decoding a block having a size of W×H, performed by a video decoding apparatus, the method comprising:
obtaining a nonrectangular splitting flag from a bitstream for the block having the size of W×H, wherein W is a width of the block, H is a height of the block, and the nonrectangular splitting flag indicates nonrectangular block splitting for the block; and
checking the nonrectangular splitting flag,
wherein, in response to a determination that the nonrectangular splitting flag is true, the method further includes
obtaining a nonrectangular splitting index from the bitstream, wherein the nonrectangular splitting index indicates one of nonrectangular splitting methods,
determining prediction units by splitting the block having the size of W×H using a nonrectangular splitting method indicated by the nonrectangular splitting index,
obtaining intra prediction modes for the prediction units from the bitstream, and
generating a prediction block of the block using the intra prediction modes.

2. The method of claim 1, wherein generating the prediction block includes:
generating reference samples of each prediction unit from previously reconstructed blocks based on each intra prediction mode;
generating prediction samples of each prediction unit using the reference samples; and
correcting the prediction samples of each prediction unit.

3. The method of claim 1, wherein the nonrectangular splitting method includes:
generating blocks $B_1, B_2, \ldots, B_K$ (here, K is a natural number of 2 or greater) as the prediction units using one of nonrectangular block splitting structure among SPLIT_RD2LT, SPLIT_LD2RT, SPLIT_RT2LD, and SPLIT_LT2RD,
wherein each of the SPLIT_RD2LT, SPLIT_LD2RT, SPLIT_RT2LD, and SPLIT_LT2RD includes block $B_1$ located at a bottom right, bottom left, top right, and top left of the block having the size of W×H.

4. The method of claim 3, wherein, for the block having the size of W×H in which 1 or more natural numbers $N_1, N_2, \ldots, N_K$ satisfy $N_1+N_2+ \ldots +N_K=W$ and 1 or more natural numbers $M_1, M_2, \ldots, M_K$ satisfy $M_1+M_2+ \ldots +M_K=H$, the prediction units are generated by excluding blocks $B_1, B_2, \ldots, B_{k-1}$ from a rectangular block having a size of $(N_1+N_2+ \ldots +N_K) \times (M_1+M_2+ \ldots +M_k)$ in which a rectangular block $B_1$ having a size of $N_1 \times M_1$ is located on the bottom right, the bottom left, the top right, or the top left of the block having the size of W×H and a nonrectangular block Bk corresponding to k (where $2 \le k \le K$) is located on the bottom right, the bottom left, the top right, or the top left of the block having the size of W×H.

5. The method of claim 3, wherein the method further includes:
deriving a prediction order in an ascending order or a descending order according to the nonrectangular splitting method,
wherein the ascending order indicates a prediction order of $B_1 \rightarrow B_2 \rightarrow \ldots \rightarrow B_K$ and the descending order indicates a prediction order of $B_K \rightarrow B_{K-1} \rightarrow \ldots \rightarrow B_1$.

6. The method of claim 1, wherein obtaining the intra prediction modes includes:
limiting an available intra prediction mode according to the nonrectangular splitting method, a size of the prediction units, and an aspect ratio of the prediction units.

7. The method of claim 2, wherein generating the reference samples includes:
generating the reference samples using reconstructed samples existing in neighboring positions of the prediction units and neighboring samples of the block having the size of W×H,
wherein when a reference sample does not exist in a neighboring position of the prediction units, the reference sample is copied from a sample value in a position closest to the neighboring position.

8. The method of claim 7, wherein generating the reference samples includes:
compensating the reference samples of the prediction units by calculating difference signals between adjacent samples using the neighboring samples of the block having the size of W×H and adding the difference signals to copied samples among the reference samples of the prediction units.

9. The method of claim 2, wherein generating the reference samples includes:
when a reference sample does not exist in a neighboring position of the prediction units, generating a reference sample in the neighboring position by weighting the sample values in positions closest to the neighboring position.

10. The method of claim 2, wherein correcting the prediction samples of each prediction unit includes:
using samples existing in reconstructed available rows and columns closest to the each prediction unit to correct the prediction samples of each prediction unit.

11. The method of claim 2, wherein correcting the prediction samples of each prediction unit includes:
for block BN (1≤N≤K) among the blocks $B_1, B_2, \ldots, B_K$, using 3+2(K−N) samples to correct a prediction sample included in the block BN.

12. The method of claim 1, in response to the determination that the nonrectangular splitting flag is true, the method further comprising:
generating residual signals of the prediction units; and
generating a reconstructed block by adding the prediction block and the residual signals.

13. The method of claim 12, wherein generating the residual signals includes:
obtaining inverse quantized signals of the prediction units and a transform unit splitting method from the bitstream, wherein the transform unit splitting method indicates one of a plurality of transform unit configurations when the prediction units are nonrectangular;
generating a transform unit according to the transform unit splitting method; and
generating residual signals by inversely transforming the inverse quantized signals using the transform unit when the prediction units are nonrectangular.

14. The method of claim 13, wherein generating the transform unit includes:
applying a same transform unit configuration to nonrectangular prediction units among the prediction units.

15. A method for encoding a block having a size of W×H, performed by a video encoding apparatus, the method comprising:
determining whether to perform nonrectangular block splitting for the block having the size of W×H, wherein W is a width of the block, and H is a height of the block; and
wherein, in response to a determination that the nonrectangular block splitting is performed, the method further includes
determining one of nonrectangular splitting methods,
determining prediction units by splitting the block having the size of W×H using the determined nonrectangular splitting method,
determining intra prediction modes for the prediction units,
generating a prediction block of the block using the intra prediction modes, and
encoding a nonrectangular splitting flag indicating nonrectangular block splitting for the block and a nonrectangular splitting index indicating the determined nonrectangular splitting method.

16. The method of claim 15, wherein generating the prediction block includes:
generating reference samples of each prediction units from previously reconstructed blocks based on each intra prediction mode;
generating prediction samples of each prediction unit using the reference samples; and
correcting the prediction samples of each prediction unit.

17. The method of claim 15, in response to the determination that the nonrectangular block splitting is performed, the method further comprising:
generating residual signals by subtracting the prediction block from an original block of the block; and
transforming the residual signals.

18. The method of claim 17, wherein transforming the residual signals includes:
obtaining a transform unit splitting method, wherein the transform unit splitting method indicates one of a plurality of transform unit configurations when the prediction units are nonrectangular;
generating a transform unit according to the transform unit splitting method; and
transforming the residual signals using the transform unit when the prediction units are nonrectangular.

19. The method of claim 18, wherein generating the transform unit includes:
applying a same transform unit configuration to nonrectangular prediction units among the prediction units.

20. A method for transmitting a bitstream containing encoded video data, the method comprising:
generating the bitstream for a current block in an image; and
transmitting the bitstream,
wherein generating the bitstream for the image comprises:
determining whether to perform nonrectangular block splitting for a block having a size of W×H, wherein W is a width of the block, and H is a height of the block, and
wherein, in response to a determination that the nonrectangular block splitting is performed, the one or more processors are further configured to
determine one of nonrectangular splitting methods,
determine prediction units by splitting the block having the size of W×H using the determined nonrectangular splitting method,
determine intra prediction modes for the prediction units,
generate a prediction block of the block using the intra prediction modes, and
encode a nonrectangular splitting flag indicating nonrectangular block splitting for the block and a nonrectangular splitting index indicating the determined nonrectangular splitting method.

* * * * *